United States Patent
Khan et al.

(10) Patent No.: US 9,019,870 B2
(45) Date of Patent: Apr. 28, 2015

(54) SYSTEMS AND METHODS FOR LOCATION MANAGEMENT AND EMERGENCY SUPPORT FOR A VOICE OVER INTERNET PROTOCOL DEVICE

(71) Applicant: AT&T Intellectual Property I, L.P., Atlanta, GA (US)

(72) Inventors: Richard L. Khan, San Ramon, CA (US); Chaoxin Qiu, Austin, TX (US); Robert F. Dailey, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/021,828

(22) Filed: Sep. 9, 2013

(65) Prior Publication Data

US 2014/0016634 A1  Jan. 16, 2014

Related U.S. Application Data

(63) Continuation of application No. 11/555,569, filed on Nov. 1, 2006, now Pat. No. 8,531,995.

(51) Int. Cl.
*H04L 12/16* (2006.01)
*H04W 4/00* (2009.01)
(Continued)

(52) U.S. Cl.
CPC ......... *H04L 29/08657* (2013.01); *H04W 48/04* (2013.01); *H04L 12/66* (2013.01); *H04W 4/02* (2013.01); *H04W 64/00* (2013.01); *H04L 65/1096* (2013.01); *H04L 67/18* (2013.01)

(58) Field of Classification Search
None
See application file for complete search history.

(56) References Cited

U.S. PATENT DOCUMENTS 5,161,180 A  11/1992  Chavous
5,235,630 A  8/1993  Moody et al.
(Continued)

FOREIGN PATENT DOCUMENTS

EP  1337089  8/2003
EP  1589721  10/2005
(Continued)

OTHER PUBLICATIONS

Akundi et al., "i2 Solution Overview," Nortel Networks, Mar. 2005 (15 pages).
(Continued)

*Primary Examiner* — Faruk Hamza
*Assistant Examiner* — Cassandra Decker
(74) *Attorney, Agent, or Firm* — Hanley, Flight & Zimmerman, LLC

(57) ABSTRACT

An example method stores a nomadic service designator and an operating mode designator in association with a public user identifier. The nomadic service designator indicates whether an IP device is allowed to access VoIP services from different network locations. The public user identifier facilitates establishing a call with the IP device. The operating mode designator indicates when the IP device is in a suspended operating mode and an unrestricted mode. The suspended operating mode restricts the IP device to a subset of communication services associated with a service subscription of the IP device, and to a 911 service. The unrestricted operating mode is based on a registered geographic location associated with the IP device being a current geographic location of the IP device, and is based on a service provider being able to provide an E911 service including a location-identification service at the current geographic location of the IP device.

17 Claims, 9 Drawing Sheets

| SITE GATEWAY ID | GATEWAY-INTERNAL ATA | PUBLIC USER ID ("PUID") | REGISTERED PUBLIC IP ADDR. | NOMADIC BLOCK | OPERATING MODE |
|---|---|---|---|---|---|
| 012345678 | Y | (555) 234-4532 | 67.10.10.1 | Y | S0 |
| 012345678 | N | (555) 234-4533 | 67.10.10.1 | Y | S2 |
| 012345678 | N | jdoe@voice.net | 67.10.10.1 | N | S1 |

(51) Int. Cl.
*H04M 11/04* (2006.01)
*H04W 24/00* (2009.01)
*H04L 29/08* (2006.01)
*H04L 12/66* (2006.01)
*H04W 4/02* (2009.01)
*H04L 29/06* (2006.01)
*H04W 48/04* (2009.01)
*H04W 64/00* (2009.01)

(56) References Cited

U.S. PATENT DOCUMENTS

| | | |
|---|---|---|
| 5,347,568 A | 9/1994 | Moody et al. |
| 5,479,482 A | 12/1995 | Grimes |
| 6,415,019 B1 | 7/2002 | Savaglio et al. |
| 6,421,009 B2 | 7/2002 | Suprunov |
| 6,650,901 B1 | 11/2003 | Schuster et al. |
| 6,678,357 B2 | 1/2004 | Stumer et al. |
| 6,707,888 B1 | 3/2004 | Cope |
| 6,771,742 B2 | 8/2004 | McCalmont et al. |
| 6,799,049 B1 | 9/2004 | Zellner et al. |
| 6,807,483 B1 | 10/2004 | Chao et al. |
| 6,927,727 B2 | 8/2005 | Cleghorn |
| 6,940,950 B2 | 9/2005 | Dickinson et al. |
| 7,027,564 B2 | 4/2006 | James |
| 7,042,985 B1 | 5/2006 | Wright |
| 7,079,627 B2 | 7/2006 | Crago et al. |
| 7,103,034 B1 | 9/2006 | Srinivas et al. |
| 7,130,385 B1 | 10/2006 | Moon |
| 7,260,186 B2 | 8/2007 | Zhu et al. |
| 7,480,933 B2 | 1/2009 | Bush et al. |
| 7,639,792 B2 | 12/2009 | Qiu et al. |
| 7,773,975 B2 | 8/2010 | Snapp et al. |
| 8,027,333 B2 | 9/2011 | Grabelsky et al. |
| 8,064,875 B2 | 11/2011 | Velazquez et al. |
| 8,189,568 B2 * | 5/2012 | Qiu |
| 8,401,003 B1 * | 3/2013 | Petit-Huguenin et al. .... 370/352 |
| 8,531,995 B2 | 9/2013 | Khan et al. |
| 8,620,257 B2 | 12/2013 | Qiu et al. |
| 2001/0022558 A1 | 9/2001 | Karr, Jr. et al. |
| 2003/0146871 A1 | 8/2003 | Karr et al. |
| 2003/0217122 A1 | 11/2003 | Roese et al. |
| 2003/0222819 A1 | 12/2003 | Karr et al. |
| 2003/0222820 A1 | 12/2003 | Karr et al. |
| 2004/0057425 A1 | 3/2004 | Brouwer et al. |
| 2004/0125923 A1 | 7/2004 | See et al. |
| 2004/0151283 A1 | 8/2004 | Lazoff |
| 2004/0198386 A1 | 10/2004 | Dupray |
| 2004/0266457 A1 | 12/2004 | Dupray |
| 2005/0026650 A1 | 2/2005 | Russell |
| 2005/0063519 A1 | 3/2005 | James |
| 2005/0074008 A1 | 4/2005 | Herledan et al. |
| 2005/0083911 A1 | 4/2005 | Grabelsky et al. |
| 2005/0090225 A1 | 4/2005 | Muehleisen et al. |
| 2005/0135569 A1 | 6/2005 | Dickinson et al. |
| 2005/0141431 A1 | 6/2005 | Caveney et al. |
| 2005/0153681 A1 | 7/2005 | Hanson |
| 2005/0175166 A1 | 8/2005 | Welenson et al. |
| 2005/0190892 A1 | 9/2005 | Dawson et al. |
| 2005/0213716 A1 | 9/2005 | Zhu et al. |
| 2005/0232164 A1 | 10/2005 | Anzarouth et al. |
| 2005/0265326 A1 | 12/2005 | Laliberte |
| 2006/0039539 A1 | 2/2006 | Goldman et al. |
| 2006/0056388 A1 | 3/2006 | Livingood |
| 2006/0068753 A1 | 3/2006 | Karpen et al. |
| 2006/0120517 A1 | 6/2006 | Moon et al. |
| 2006/0133354 A1 | 6/2006 | Lee |
| 2006/0201622 A1 | 9/2006 | Sehr et al. |
| 2007/0058615 A1 | 3/2007 | Hasenfang et al. |
| 2007/0104183 A1 | 5/2007 | Bakke et al. |
| 2007/0115935 A1 | 5/2007 | Qiu et al. |
| 2007/0127452 A1 | 6/2007 | Croy |
| 2007/0147345 A1 | 6/2007 | Lowmaster |
| 2007/0189469 A1 | 8/2007 | Croak et al. |
| 2007/0201622 A1 | 8/2007 | Croak et al. |
| 2007/0230440 A1 | 10/2007 | Joong et al. |
| 2007/0280213 A1 | 12/2007 | Sindhwani et al. |
| 2008/0008179 A1 | 1/2008 | Chen et al. |
| 2008/0096504 A1 * | 4/2008 | Linkola et al. ............. 455/187.1 |
| 2008/0125077 A1 | 5/2008 | Velazquez et al. |
| 2008/0200143 A1 | 8/2008 | Qiu et al. |
| 2008/0276305 A1 | 11/2008 | Chan et al. |
| 2008/0285544 A1 | 11/2008 | Qiu et al. |
| 2009/0003312 A1 | 1/2009 | Velazquez et al. |

FOREIGN PATENT DOCUMENTS

| | | |
|---|---|---|
| WO | 2005104518 | 11/2005 |
| WO | 2006023190 | 3/2006 |
| WO | 2007056186 | 5/2007 |

OTHER PUBLICATIONS

Cauley, "AT&T solves VoIP's 911 issue," USA Today, Oct. 10, 2005 (2 pages) [Retrieved via Internet at http://www.usatoday.com/tech/news/techinnovations/2005-10-10-voip-att_x.htm].

"CCS/SS7 Generic Requirements in Support of E9-1-1 Service," Telecordia, Dec. 2002 (3 pages) [Retrieved via Internet at http://telecom-info.telcordia.com/site-cgi/ido/docs.cgi?ID=SEARCH&DOCUMENT=GR-2956&].

"CCS/SS7 Generic Requirements in Support of E9-1-1 Service Contents," GR-2956-Core, Dec. 2002 (3 pages).

Rosenberg et al., "SIP: Session Initiation Protocol," Network Working Group, RFC 3261, Jun. 2002 (269 pages).

Rosenberg et al., "Reliability of Provisional Responses in the Session Initiation Protocol (SIP),"RFC 3262, Network Working Group, Jun. 2002 (14 pages).

Rosenberg et al., "Session Initiation Protocol (SIP): Locating SIP Servers," Network Working Group, RFC 3263, Jun. 2002 (17 pages).

Rosenberg et al., "An Offer/Answer Model with the Session Description Protocol (SDP),"Networking Group, RFC 3264, Jun. 2002 (25 pages).

International Bureau, "International Preliminary Report on Patentability," issued in connection with PCT application Serial No. PCT/US2008/051141, issued Aug. 26, 2009 (13 pages).

E. Gabber et al., "On Location-Restricted Services", IEEE Network, Nov./Dec. 1999, pp. 44-52.

Patent Cooperation Treaty, "International Search Report," issued by the International Searching Authority in connection with related PCT application No. PCT/US2008/051141, mailed Mar. 27, 2009 (6 pages).

Patent Cooperation Treaty, "Written Opinion of the International Searching Authority," issued by the International Searching Authority in connection with related PCT application No. PCT/US2008/051141, mailed Mar. 27, 2009 (11 pages).

National Emergency Number Association (NENA) Technical Committee Chairs, "Interim VoIP Architecture for Enhanced 9-1-1 Services (i2)," NENA Template for Creating or Updating E9-1-1 Standards Documents, Issue 1 DRAFT, Aug. 5, 2005, 196 pages.

AT&T Business Service Guide, AT&T Business Voice over IP (BVoIP) Services, Oct. 31, 2006, 40 pages.

Frost & Sullivan, "U.S. E9-1-1 Market Insight 6847-63," www.frost.com, 2003, 61 pages.

United States Patent and Trademark Office, "Non-Final Office Action," issued in connection with U.S. Appl. No. 11/555,569, on Jan. 12, 2011 (21 pages).

United States Patent and Trademark Office, "Final Office Action," issued in connection with U.S. Appl. No. 11/555,569, on May 24, 2011 (24 pages).

United States Patent and Trademark Office, "Non-Final Office Action," issued in connection with U.S. Appl. No. 11/555,569, on Nov. 7, 2012 (25 pages).

United States Patent and Trademark Office, "Notice of Allowance," issued in connection with U.S. Appl. No. 11/555,569, on May 10, 2013 (15 pages).

* cited by examiner

SYSTEMS AND METHODS FOR LOCATION MANAGEMENT AND EMERGENCY SUPPORT FOR A VOICE OVER INTERNET PROTOCOL DEVICE

PRIORITY APPLICATION

This is a continuation of U.S. patent application Ser. No. 11/555,569, filed Nov. 1, 2006, which is hereby incorporated herein by reference in its entirety.

FIELD OF THE DISCLOSURE

The present disclosure relates generally to communication systems and, more particularly, to systems and methods for location management and emergency support for a voice over internet protocol device.

BACKGROUND

Internet protocol-enabled telecommunication providers in the United States are required by the Federal Communications Commission ("FCC") to support enhanced 911 ("E911") emergency call services. That is, when a telephone user dials 9-1-1, the telecommunication carrier must be able to process the call to determine the geographic location from where the call is originated to enable dispatching emergency personnel to the location of the 911 caller. Enhanced 911 service differs from traditional (non-enhanced) 911 service in that E911 service routes an emergency call to a 911 dispatcher and provides the dispatcher with the geographic location (e.g., street address) from which the call originated, while traditional 911 service routes an emergency call to a 911 dispatcher without providing the dispatcher with geographic location information indicating where the call originated.

In traditional public switched telephony networks ("PSTN"), the geographic information retrieval support for E911 is implemented by fixing associations between wireline telephone numbers and geographic street addresses. Telecommunication providers usually store a subscriber's location (e.g., a street address) in a database associated with an assigned telephone number (e.g., a call back number ("CBN")) during the service activation. When a PSTN user makes a 911 call, the calling telephone number (i.e., the CBN) of the incoming 911 call can be used to look up the geographic location of the caller, and the retrieved location information can be used to dispatch emergency personnel to the caller.

The introduction of voice over IP ("VoIP") technology introduces various challenges to service providers seeking to support E911 services. In particular, under a nomadic service (i.e., a service allowing subscribers to connect VoIP telephones at various network locations), a VoIP subscriber can easily disconnect a VoIP telephone from one location (e.g., the subscriber's home or workplace), connect the VoIP telephone in another location (e.g., a visited local area network ("LAN"), a coffee shop, a vacation spot, etc.), and register the VoIP telephone with the VoIP service provider to place telephone calls from the other location. This nomadic capability of VoIP phones introduces the potential for inaccurate associations between telephone numbers and physical or geographic locations.

DETAILED DESCRIPTION

Figure 1:
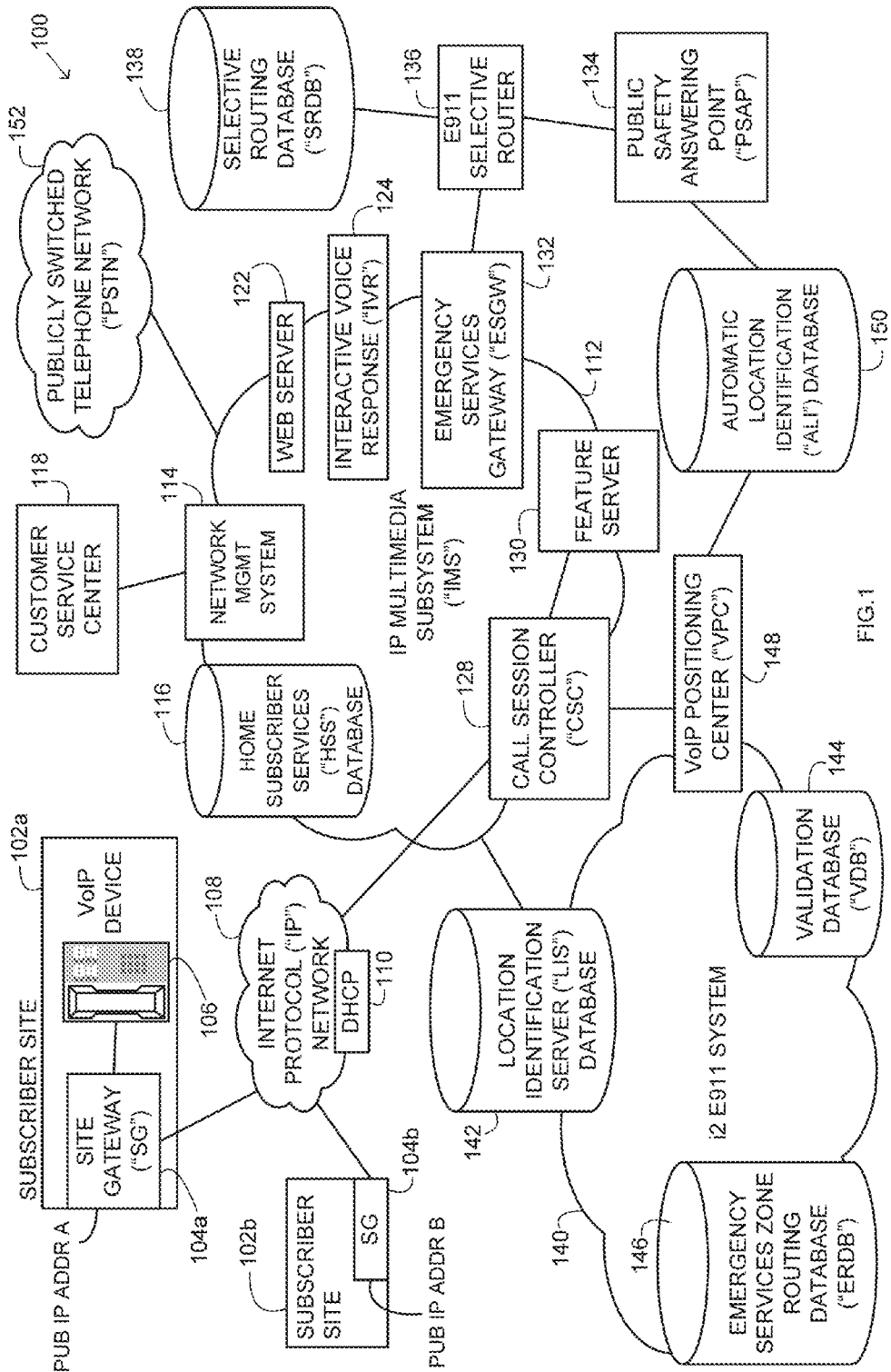
FIG. 1 is a schematic diagram depicting an example network system.

The example methods and apparatus described herein may be used to manage location information associated with voice over internet protocol ("VoIP") devices to support E911 services for those VoIP devices. Traditional E911 services based on the plain old telephone system ("POTS") provide POTS telephone service subscribers with emergency assistance service that is capable of pinpointing the geographic calling location of a caller for emergency personnel (e.g., firemen, policemen, paramedics, etc.). In this manner, although a caller may be unable to speak into the telephone due to, for example, illness or injury, the receiving 911 dispatcher can obtain a physical address or geographic location from which the caller is calling and dispatch emergency personnel to that location. Unlike traditional POTS telephone service, which is implemented in connection with traditional wireline telephone numbers that are associated with corresponding fixed geographic locations (e.g., a subscriber's home street address), IP-enabled communication services (e.g., VoIP services) do not always restrict an IP telephone number to being permanently associated with or assigned to (e.g., located at) a particular geographic location. Instead, some VoIP service providers enable a VoIP device associated with a particular telephone number to nomadically move or roam through a service provider network or through various service provider networks. That is, a subscriber may disconnect a VoIP device from a service provider network at a first location (e.g., the subscriber's home) and reconnect the VoIP device into the same service provider network or a different service provider network at a second location (e.g., a work place). The example systems and methods described herein enable service provider networks to provide E911 services to subscribers even though these subscribers move their VoIP devices between various locations. As described in greater detail below, the example systems and methods determine when a VoIP device has been moved between two network locations and prompt a user of the moved VoIP device to confirm a geographic location change and/or provide updated geographic location information (e.g., a current street address) associated with the current network location of the VoIP device. Some example implementations determine when a VoIP device is not eligible for nomadic use and deny VoIP services to nomadic-disabled devices when they identify an attempt to operate the VoIP device in a network location different from the VoIP devices registered location. Alternatively or additionally, the example systems and methods can be used to deny service to VoIP devices connected to networks or portions of a network for which a VoIP service provider cannot provide E911 service. A VoIP service provider may be a telephone company, a cable company, a satellite company, an Internet service provider, a utility (e.g., electricity) service provider, etc.

Some disclosed example methods of managing location information for emergency support of a VoIP communication device involve determining a geographic location change status associated with the internet protocol device. A message (e.g., an audio message, a text message, a video message, etc.) is then presented via the VoIP device based on the geographic location change status requesting a user to confirm whether a registered geographic location (e.g., a street address) associated with the VoIP device is a current geographic location of the VoIP device.

In some example implementations, a current IP address associated with the VoIP device (e.g., a registration public IP address used by the VoIP device to register with a VoIP network) is used to determine the geographic location change status of the VoIP device. For example, the current IP address can be compared to a previous IP address (e.g., a registered IP address) registered in associated with the VoIP device. If the current IP address and the previous IP address differ, the geographic location change status is updated to indicate that the geographic location of the VoIP device may have changed from a geographic location previously registered in association with the VoIP device. A network server (e.g., a dynamic host configuration protocol ("DHCP") server) may assign the current IP address to the VoIP device or to a network access device (e.g., a residential gateway) connected to the VoIP device and through which the VoIP device accesses network services.

A service provider network may use the geographic location change status to set an operating mode of the VoIP device. In an example implementation, a geographic location change status indicating that the VoIP device has not moved to another geographic location corresponds to an unrestricted operating mode (S0 mode) that enables the VoIP device to access substantially all subscribed to communication services provided by a service provider associated with the VoIP device. Another geographic location change status of the illustrated example indicating that the VoIP device may have moved to another geographic location corresponds to a suspended operating mode (S1 mode) that restricts the VoIP device to accessing a subset of all otherwise available communication services provided by a service provider. For example, in the suspended operating mode, the VoIP device may be allowed to receive VoIP calls and make VoIP calls to one or more telephone numbers (e.g., a customer service telephone number, a 911 operator) pre-selected by a VoIP service provider. Yet another geographic location change status of the illustrated example indicating that the IP device is located within a geographic location at which a VoIP service provider cannot provide emergency service (e.g., E911 service) corresponds to a restricted operating mode (S2) that may allow access to the same or less (e.g., none) services than the suspended (S1) operating mode.

In some example implementations, the operating mode may be selected by a service provider network based on a user's response to a message presented via the VoIP device. For example, the service provider network may select a particular operating mode if the user confirms that the registered geographic location is the same as the currently logged geographic location. Additionally or alternatively, the service provider network may determine whether the IP device is eligible to roam (i.e., the VoIP device is nomadic-enabled) between different network locations of the service provider network. The service provider network can then select an operating mode that denies access to at least some services if the VoIP device is not eligible to roam. (i.e., the VoIP device is nomadic-blocked). After setting the operating mode of the VoIP device, another message (e.g., an audio message, a text message, a video message, etc.) may be presented via the VoIP device to inform a user of the operating mode change and/or the reason for the change.

Some disclosed example systems to manage location information for emergency support of a VoIP communication device include an interface configured to receive a current IP address (i.e., a registration IP address) associated with the VoIP device. These example systems also include a comparator configured to compare the current IP address with a registered IP address. The comparison indicates that the VoIP device may have been moved (e.g., a suspected location change) or that the VoIP device has not been moved. If a suspected location change is indicated, the system may interact with the user to confirm and/or update records to reflect the current geographic location. For instance, the example system includes a user interface (e.g., an interactive voice response ("IVR") interface) configured to present a message (e.g., an audio message, a text message, a video message, etc.) via the VoIP device based on the comparison requesting a user to confirm whether a registered geographic location (e.g., a street address) associated with the VoIP device is the same as a current geographic location of the VoIP device and/or to identify the current geographic location of the VoIP device.

The response may indicate that the VoIP device has been moved or has not been moved from a first geographic location to a second geographic location. The user interface may be further configured to instruct the user to navigate to an internet location (e.g., a webpage) to update the registered geographic location when, for example, the response indicates that the VoIP device has been moved from a first geographic location to a second geographic location.

The current IP address (i.e., the registration IP address) may be assigned to the VoIP device or to a network access device (e.g., a residential gateway, a site gateway, etc.) connected to the VoIP device and through which the VoIP device accesses network services. In some example implementations, the current IP address is different from the registered IP address. For example, the registered IP address may be associated with a geographic location within which the VoIP device was located prior to being associated with the current IP address. In some example implementations, the system includes a data structure configured to store the registered IP address associated the VoIP device.

To select an operating mode associated with the VoIP device based on the comparison of the current IP address and the registered IP address, some example systems are provided with a mode selector. The mode selector may also select the operating mode based the user's response to the message. In an example implementation, the mode selector is configured to set the operating mode to restrict the VoIP device to access a subset of all communication services associated with a service subscription corresponding to the VoIP device. The system may also be provided with a services interface configured to determine whether the VoIP device is eligible for nomadic use and configured to cause the mode selector to set the operating mode to deny access to at least some services if the VoIP device is not eligible for nomadic use.

As will be readily apparent to persons of ordinary skill in the art, the example methods, apparatus, and systems described herein may be implemented using instructions stored on one or more machine accessible media (e.g., a CD-ROM, a magnetic storage device, an optical storage device, a solid-state storage device, etc.) associated with one or more network system devices. In this manner, the machine accessible media may be used to enable network system devices to retrieve and execute the instructions to implement the example methods, apparatus, and systems described herein.

An example network system 100 is shown in FIG. 1. The example system 100 of FIG. 1 includes subscriber sites 102a and 102b. Each of the subscriber sites 102a and 102b includes a respective subscriber site gateway 104a and 104b (e.g., a residential gateway). The subscriber sites 102a-b may be residential dwellings and/or business sites (e.g., a coffee shop, an education facility, an office, an industrial building, etc.), and may have separate respective LAN's and/or PBX's located therein which are communicatively coupled to a respective one of the site gateways 104a-b. In the illustrated example, the site gateways 104a and 104b are used to provide user equipment (e.g., VoIP devices, computers, etc.) network access to the example network system 100 and may be implemented using wire-interface gateways (e.g., wired Ethernet, IEEE-802.3, Universal Serial Bus ("USB"), etc.) or wireless gateways (e.g., wireless Ethernet, IEEE-802.11, Wi-Fi®, Bluetooth®, etc.).

In the illustrated example, a VoIP device 106 (e.g., a wired or wireless VoIP telephone, a plain old telephone system ("POTS") analog telephone connected to an analog telephone adapter ("ATA"), a wired or wireless IP data/voice communicator, a personal desktop, laptop, or tablet computer having VoIP capabilities, etc.) is communicatively coupled to the subscriber site gateway 104a. The site gateway 104a provides the VoIP device 106 network access to an Internet protocol ("IP") network 108, which may include one or more Internet service provider ("ISP") networks. The VoIP device 106 is capable of making VoIP calls via the example IP network 108. The IP network 108 includes a function that assigns public IP addresses to the site gateways 104a-b. In the illustrated example, the function to assign public IP addresses may be implemented using, for example, a dynamic host configuration protocol ("DHCP") server 110. As shown in the illustrated example of FIG. 1, the first site gateway 104a is assigned a public IP address A and the second site gateway 104b is assigned a public IP address B. Although two subscriber sites (i.e., the subscriber sites 102a-b) and two site gateways (i.e., the site gateways 104a-b) are shown in FIG. 1, any number of subscriber sites and site gateways may be used in connection with the examples described herein.

In the illustrated example, the VoIP device 106 can be associated with a non-nomadic service (i.e., a nomadic-blocked service) or a nomadic service (i.e., a nomadic-enabled service). A non-nomadic service limits the VoIP device 106 to making VoIP calls from only a pre-selected network location (e.g., from only the subscriber site 102a). Under a non-nomadic service, the VoIP device 106 may be used to make VoIP calls from, for example, the subscriber site 102a, but not from the subscriber site 102b. In contrast, a nomadic service allows the VoIP device 106 to make calls from a plurality of network locations. That is, in the illustrated example, the VoIP device 106 can be used to make VoIP calls from both of the subscriber sites 102a-b. A subscriber or user can change the nomadic option for the VoIP device 106 via the user's account. In some example implementations, the VoIP device 106 may be associated with a plurality of telephone numbers. For each telephone number, a user can select a different nomadic option. In this manner, when the VoIP device 106 is used from a home location (e.g., the subscriber site 102a), any of a plurality of telephone numbers associated with the VoIP device 106 can be used to make VoIP calls. However, when the VoIP device 106 is connected to a visiting site (e.g., the subscriber site 102b), only those telephone numbers associated with a nomadic option can be used to make VoIP calls.

To enable VoIP services, the example network system 100 is provided with an internet protocol multimedia subsystem ("IMS") 112. The IMS 112 enables different communication technologies (e.g., features, services, communication software and equipment, etc.) to work together to deliver enriched communications (e.g., VoIP communications) to subscribers. The IMS 112 of the illustrated example is implemented according to one or more industry standard specifications. Although the IMS 112 is used in the illustrated example, the example systems and methods described herein may be used in connection with IP multimedia and telephony core network architectures other than the IMS 112. For example, IP multimedia and telephony core network architectures other than the IMS 112 may be used to enable VoIP services in the example network system 100.

To manage subscriber services, the IMS 112 is provided with a network management system ("NMS") 114 that is communicatively coupled to a home subscriber services ("HSS") database 116. In the illustrated example, the NMS 114 is used to manage and track which subscribers have subscribed to which features or services and to enable access to those features by subscribers. The NMS 114 stores records in the HSS database 116 indicative of subscriber's respective features and services. To implement a service change (e.g., provisioning, a device registration, an upgrade, an update, etc.), the NMS 114 is notified of the service change, and the NMS 114 stores information in the HSS database 116 indicative of the service change. In the illustrated example, the NMS 114 is also configured to receive and process the initial geographic location information (e.g., street addresses) associated with a VoIP device (e.g., the VoIP device 106) when VoIP service is initially provisioned.

To allow subscribers to interact with customer service representatives, the NMS 114 is coupled to a customer service center 118. In the illustrated example, a subscriber can interact with a customer service representative at the customer service center 118 to change a nomadic option associated with the VoIP device 106. In addition, when the VoIP device 106 is moved to a different geographic location, the subscriber can interact with the customer service representative to provide the street address of the new geographic location. In addition, to enable a subscriber to access a web page to change nomadic options and/or to provide the street address of current geographic location, the IMS 112 is provided with a web server 122.

To inform a subscriber of a suspected geographic location change, the IMS 112 is provided with an interactive voice response ("IVR") system 124. When a subscriber initiates a VoIP call via the VoIP device 106, the IVR system 124 is configured to playback an audio message via the VoIP device 106 when a VoIP service provider detects that the VoIP device 106 may have been moved to a different geographic location (e.g. moved from the subscriber site 102a to the subscriber site 102b). The IVR system 124 may include a sound file player and/or a text-to-speech converter (e.g., a speech synthesizer) to present one or more audio messages.

In the illustrated example, the IVR message plays back a previously registered street address or last known registered street address of the VoIP device 106 and requests the subscriber of the VoIP device 106 to confirm whether the registered street address is the same as the current street address at which the VoIP device 106 is located. The subscriber can then confirm that the street addresses are the same or, if the street addresses are different, the subscriber can change the registered street address via the IVR 124, a customer service representative, or an account web page served by the web server 122. Additionally or alternatively, the subscriber can contact the customer service center 118 to change the registered street address.

To control and process call sessions of VoIP devices (e.g., the VoIP device 106), the IMS 112 is provided with a call session controller ("CSC") 128. The call session controller 128 implements a call session control function ("CSCF") that determines whether a call should be established and which features or services should be used to establish the call based on subscribed features or services (e.g., nomadic-enabled service, calls to a PSTN allowed, etc.) of a subscriber.

The IMS 112 is also provided with a feature server 130. The feature server 130 stores the registration (current) public IP addresses (e.g., the public IP address A of the site gateway 104a) used by VoIP devices (e.g., the VoIP device 106) to register with the IMS 112. That is, when the VoIP device 106 registers with the IMS 112, the HSS 116 receives the public IP address A (i.e., a registration public IP address) used by the VoIP device 106 to register. The HSS 116 then forwards a notification including the public IP address A to the feature server 130, and the feature server 130 stores the public IP address A for future comparisons with other registration IP addresses that the VoIP device 106 may use to register. In addition to storing the public IP address A, the feature server 130 also associates itself with the VoIP device 106 for the duration of its registration. In the illustrated example, the feature server 130 also compares each registration public IP address with a corresponding registered public IP address (i.e., a public IP address used previously by the VoIP device 106 to register with the IMS 112) to determine a location change status (e.g., determine whether the VoIP device 106 may have moved from one geographic location to another).

The feature server 130 also stores the current operating mode (e.g., the unrestricted operating mode (S0 mode), the suspended operating mode (S1 mode), or the restricted mode (S2 mode)) associated with each VoIP device registered with the IMS 112. In the illustrated example, the feature server 130 is configured to change operating modes from the unrestricted operating mode (S0 mode) to the suspended operating mode (S1 mode) based on comparisons of registration public IP addresses with registered public IP addresses. For example, if the feature server 130 determines that the registration public IP address A associated with the VoIP device 106 is different from a registered public IP address associated with the VoIP device 106, the feature server 130 determines that the VoIP device 106 may have been moved from one geographic location to another. In response, the feature server 130 changes the operating mode associated with the VoIP device 106 to the suspended operating mode (S1 mode) to allow the VoIP device 106 to receive calls and/or to make calls to phone numbers pre-selected by a VoIP service provider such as, for example, a customer service phone number, but to block calls to other (non-preselected) phone numbers.

The feature server 130 is also configured to change operating modes to the suspended operating mode (S1 mode) or the restricted mode (S2 mode) at the direction of the NMS 114. For example, if the user of the VoIP device 106 registers a geographic address that is in a location for which E911 services cannot be provided, the NMS 114 can instruct the feature server 130 to change the operating mode associated with the VoIP device 106 to the restricted mode (S2 mode). The NMS 114 can also instruct the feature server 130 to change the operating mode associated with a VoIP device 106 from the restricted operating mode (S2) to the suspended operating mode (S1).

The feature server 130 is configured to determine the type of message to be presented to a user by the IVR 124 based on, for example, the operating mode associated with the VoIP device 106. In the illustrated example, when the IMS 112 processes a call from the VoIP device 106 while the operating mode of the VoIP device 106 is set to the S1 mode or the S2 mode, the feature server 130 routes the call to the IVR 124 and instructs the IVR 124 to present a message (e.g., playback an audio announcement) and/or obtain a confirmation response (e.g., a response confirming the correctness of a registered geographic address) from a user. For example, the feature server 130 may instruct the IVR 124 to present a message requesting a user to confirm whether the registered geographic location of the VoIP device 106 is correct and, if not, requesting the user to provide an updated geographic street address of the new location. In the illustrated example, the feature server 130 is also configured to change operating modes associated with the VoIP device 106 from the restricted operating mode (S1) to the unrestricted operating mode (S0) based on the confirmation response. For example, the feature server 130 can change the operating mode of the VoIP device 106 from S1 to S0 when the user confirms that the registered geographic location presented by the IVR 124 is correct.

Also, the feature server 130 informs the IVR 124 from where to obtain the registered geographic address of the VoIP device 106. In example implementations in which audio files (e.g., .wav files) are used by the IVR 124 to playback registered geographic addresses to users, the feature server 130 is configured to store uniform resource locator (URL) addresses corresponding to network locations (e.g., servers, network directories, etc.) in which the audio files are stored.

To route emergency calls, the IMS 112 is provided with an emergency services gateway ("ESGW") 132. The emergency services gateway 132 uses information received via an emergency call's call setup signaling to determine a path (e.g., a trunk) via which to route the emergency call for E911 handling.

To handle emergency calls, the example network system 100 is provided with a public safety answering point ("PSAP") 134. The PSAP 134 corresponds to a particular geographic area, and dispatchers at the PSAP 134 handle emergency calls originating from VoIP devices within that geographic area. In this manner, dispatchers can dispatch emergency services personnel from a location nearest the geographic location of a 911 caller. Although one PSAP is shown, the example network system 100 may be implemented using any number of PSAP's, each corresponding to one or more respective geographic area(s).

To route emergency calls to the PSAP 134, the example network system 100 is provided with a 911 selective router 136. The 911 selective router 136 routes emergency calls to the correct PSAP based on information received from the emergency services gateway 132 and a selective routing database ("SRDB") 138. For example, during an emergency call, the emergency services gateway 132 communicates an emergency services query key ("ESQK") to the 911 selective router 136. The ESQK is a call identifier that represents an emergency call for the duration of the call and is used by the selective router 136 to route an emergency call to the correct PSAP (e.g., the PSAP 134).

After the 911 selective router 136 receives the ESQK from the emergency services gateway 132, the 911 selective router 136 forwards the ESQK to the SRDB 138 to obtain an emergency service number ("ESN") identifying a PSAP to which to route the emergency call. The SRDB 138 stores ESQK's in association with respective ESN's. An ESN is a number used to indicate a particular group of emergency service agencies (e.g., police department, fire department, medical agency) that serves a particular geographic area and facilitates routing an emergency call to the PSAP that serves that geographic area.

To enable the example network system 100 to implement operations associated with receiving and processing emergency calls made from VoIP devices (e.g., the VoIP device 106), the example network system 100 is provided with an i2 E911 system 140. To store street addresses in association with respective telephone numbers of VoIP devices and to determine whether a call is originating from a geographic area in which a corresponding VoIP service provider can provide E911 services, the i2 E911 system 140 is provided with a location identification server ("LIS") database 142. In the illustrated example, the LIS database 142 stores a record for each telephone number of the VoIP device 106, and each record is used to store the geographic location (e.g., the street address) of the subscriber site 102a in association with the telephone number in that record. The NMS 114 communicates initial geographic location information (e.g., initial street addresses) to the LIS database 142 during initial VoIP subscription enrollments. In addition, any time the VoIP device 106 moves to another geographic location and a corresponding subscriber provides an updated street address via, for example, the customer service center 118 or the web server 122, the IMS 112 communicates the updated street address to the LIS database 142.

The i2 E911 system 140 is also provided with an emergency services zone ("ESZ") routing database ("ERDB") 146. Each ESZ corresponds to a particular emergency service number ("ESN") that uniquely identifies the ESZ. For each ESZ, the ERDB 146 stores an emergency services routing number ("ESRN") corresponding to an E911 selective router that serves that ESZ and a respective ESN. In the illustrated example, an ESRN is used to route an emergency call to an E911 selective router serving the ESZ corresponding to the geographic area within which the emergency call originated.

During registration of a street address or when a subscriber provides an updated street address, the LIS database 142 uses the ESRN's stored in the ERDB 146 to determine whether the provided street address is located within an area in which a corresponding VoIP service provider can provide E911 service. For example, the LIS database 142 accesses the ERDB 146 to retrieve an ESRN corresponding to the provided street address and determines whether the VoIP service provider can provide E911 service to the provided street address based on the ESRN. Regardless of whether the LIS database 142 determines that the VoIP service provider can or cannot provide E911 service to the provided street address, the LIS database 142 updates the registered geographic location of the VoIP device 106 with the provided street address. However, if the LIS database 142 determines that the VoIP service provider cannot provide E911 service to the provided street address, the LIS database 142 informs the NMS 114 that the VoIP device 106 is in a location at which E911 service is not available. In this manner, the NMS 114 can instruct the feature server 130 to set the operating mode associated with the VoIP device 106 to a restricted mode (S2 mode) so that the VoIP device 106 can access only a subset of services (e.g., receive calls only, connect to a 911 dispatcher without the location-identification services of E911) that are, for example, associated with a service subscription corresponding to the VoIP device 106.

To validate geographic location information (street addresses) to be stored in the LIS database 142, the i2 E911 system 140 is provided with a validation database ("VDB") 144. The VDB 144 stores a plurality of street addresses in a format compliant with the master street address guide ("MSAG") standard. In the illustrated example, when a subscriber provides a street address, and before the street address is stored in the LIS database 142, the i2 E911 system 140 compares the user-provided street addresses with known street addresses in the VDB 144 to determine whether the provided street address is MSAG-compliant. If the provided street address is MSAG-compliant, then the i2 E911 system 140 validates the provided street address and updates a corresponding registered street address in the LIS database 142. Otherwise, if the provided street address is not MSAG-compliant (e.g., the address includes a typographical error, an incorrect zip code, etc.), the i2 E911 system 140 indicates that the provided street address is invalid, and the IMS 112 informs the subscriber of the invalidity and requests the user to provide a compliant street address.

To retrieve emergency call routing information from the ERDB 146 and street addresses from the LIS database 142 to process an emergency call, the i2 E911 system 140 is provided with a VoIP positioning center ("VPC") 148 communicatively coupled to the CSC 128. When the CSC 128 receives an emergency call, the CSC 128 queries the VPC 148 to determine the E911 selective router to which the emergency services gateway 132 should route the emergency call.

The PSAP 134 is coupled to an automatic location identification ("ALI") database 150 to enable the PSAP 134 to retrieve geographic street addresses from which emergency calls originate. The ALI database 150 stores geographic street addresses corresponding to the locations of telephones connected to a traditional publicly switched telephone network ("PSTN") 152. The VPC 148 stores geographic street addresses associated with VoIP devices that it retrieves from the LIS database 142. When the PSAP 134 requires a street address of a VoIP device 106, the ALI 150 queries the VPC 148 for the street address. In response, the VPC 148 forwards the street address associated with the VoIP device 106 to the ALI database 150. The ALI database 150 then provides the street address to the PSAP 134.

Figure 2:
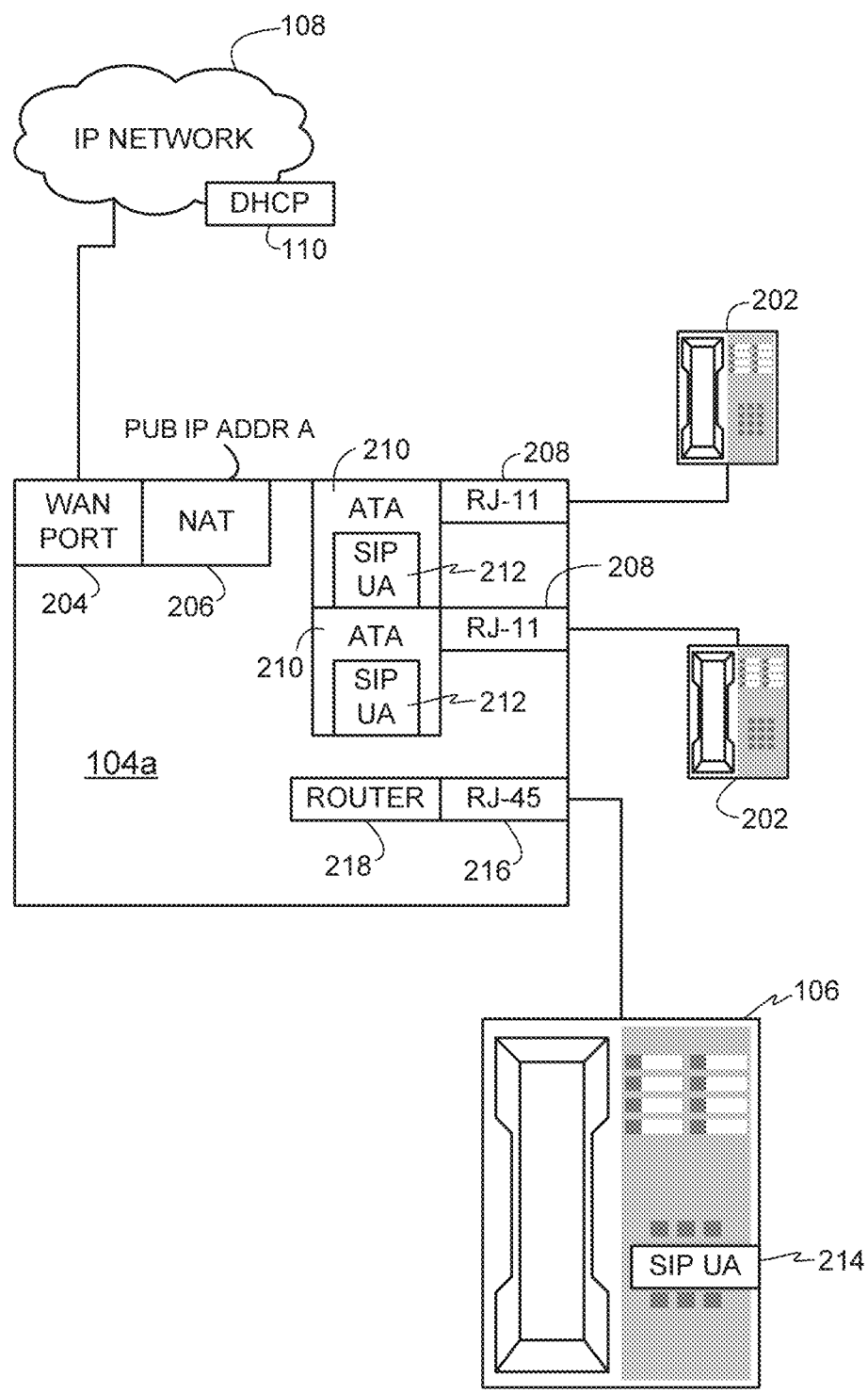
FIG. 2 illustrates an example implementation of the site gateway of FIG. 1.

FIG. 2 illustrates an example implementation of the site gateway 104a. To make VoIP calls via the site gateway 104a, a plurality of plain old telephone system ("POTS") analog telephones 202 and/or the VoIP device 106 are communicatively coupled to the site gateway 104a of FIG. 2. The site gateway 104a is provided with a plurality of RJ-11 ports 208 to which the analog telephones 202 are communicatively coupled. In addition, to convert between analog and digital communications for the analog telephones 202, the site gateway 104a is provided with analog telephone adapters ("ATA's") 210. To communicatively couple the site gateway 104a to the IP network 108, the site gateway 104a is provided with a wide area network ("WAN") port 204. In the illustrated example, the DHCP server 110 of the IP network 108 assigns a public IP address (e.g., the public IP address A) to the site gateway 104a to enable the site gateway 104a to access Internet services via the IP network 108. To enable the devices 202 to access Internet services via the site gateway 104a, the site gateway 104a associates a unique private IP address with each of the ATA's 210. To enable the device 106 to access Internet services via the site gateway 104*a*, the site gateway 104*a* associates a private IP address with the device 106. The site gateway 104*a* is provided with a network address translator ("NAT") 206 to translate between the private IP addresses and the public IP address A of the site gateway whenever any of the devices 202 and 106 exchange, send, and/or receive information with, to, and/or from the IP network 108 via the site gateway 104*a*.

To enable each of the analog telephones 202 to communicate information via a session initiation protocol ("SIP"), each of the ATA's 210 integrated in the gateway 104*a* is provided with a gateway-integrated SIP user agent ("SIP UA") 212. When the site gateway 104*a* is powered, the SIP UA's 212 register with the IMS 112 to enable the analog telephones 202 to make VoIP calls. Each time the site gateway 104*a* is booted (e.g., each time power is cycled), the SIP UA's 212 re-register with the IMS 112. Also, each time the site gateway 104*a* is booted, the DHCP server 110 of the IP network 108 may assign the same or a different public IP address to the site gateway 104*a*.

In the illustrated example, the VoIP device 106 includes a SIP UA 214 and is capable of exchanging digital information network packets with the site gateway 104*a*. Accordingly, it is not necessary to use another SIP UA (e.g., one of the SIP UA's 212) or an ATA (e.g., the ATA 210) in the site gateway 104*a* for communications with the VoIP device 106. As shown, the site gateway 104*a* is provided with an RJ-45 port 216 to which the VoIP device 106 is communicatively coupled. In addition, the site gateway 104*a* is provided with a router 218 for routing the network traffic corresponding to the VoIP device 106. In the illustrated example, the site gateway 104*a* assigns a unique private IP address to the SIP UA 214 of the VoIP device 106. After the site gateway 104*a* is powered and the VoIP device 106 is connected to the RJ-45 port 216, the SIP UA 214 registers the VoIP device 106 with the IMS 112 to enable the VoIP device 106 to make VoIP calls. Each time the VoIP device 106 is re-connected to the site gateway 104*a* or is connected to a different site gateway (e.g., the site gateway 104*b* of FIG. 1), the SIP UA 214 re-registers with the IMS 112.

The VoIP device 106 can be associated with one or more telephone numbers used to implement public user ID's ("PUID's"). In the illustrated example, a PUID is used to establish a VoIP call with a VoIP device 106. A conventional (XXX) YYY-ZZZZ type phone number can be used as the PUID. Alternatively or additionally, the PUID may be implemented using any other format instead of a telephone number format (e.g., an e-mail address format). When a user subscribes to a VoIP telephony service or adds a VoIP telephone line, the NMS 114 (FIG. 1) of a VoIP service provider allocates a PUID (e.g., a telephone number) to the user and stores geographic location information (e.g., a street address) in the LIS database 142 in association with the PUID. In addition, the NMS 114 identifies a plurality of features (e.g., nomadic-enabled or nomadic-blocked) associated with the PUID and stores the features in the HSS database 116 (FIG. 1). For example, if the user expects to operate the VoIP device 106 at a single location (e.g., the subscriber site 102*a*), the user may elect to block nomadic operation of the VoIP device. If the VoIP device 106 is moved to another geographic location, the VoIP service provider will deny the VoIP device 106 access to VoIP services because it is designated as nomadic-blocked. However, if the user expects to move the VoIP device 106 between different sites (e.g., between the subscriber sites 102*a-b*), the user may elect to allow nomadic operation of the VoIP device 106. In this manner, when the VoIP device 106 is moved to a different location, the VoIP service provider will allow operation of the VoIP device 106 because it is designated as nomadic-allowed.

Figure 3:
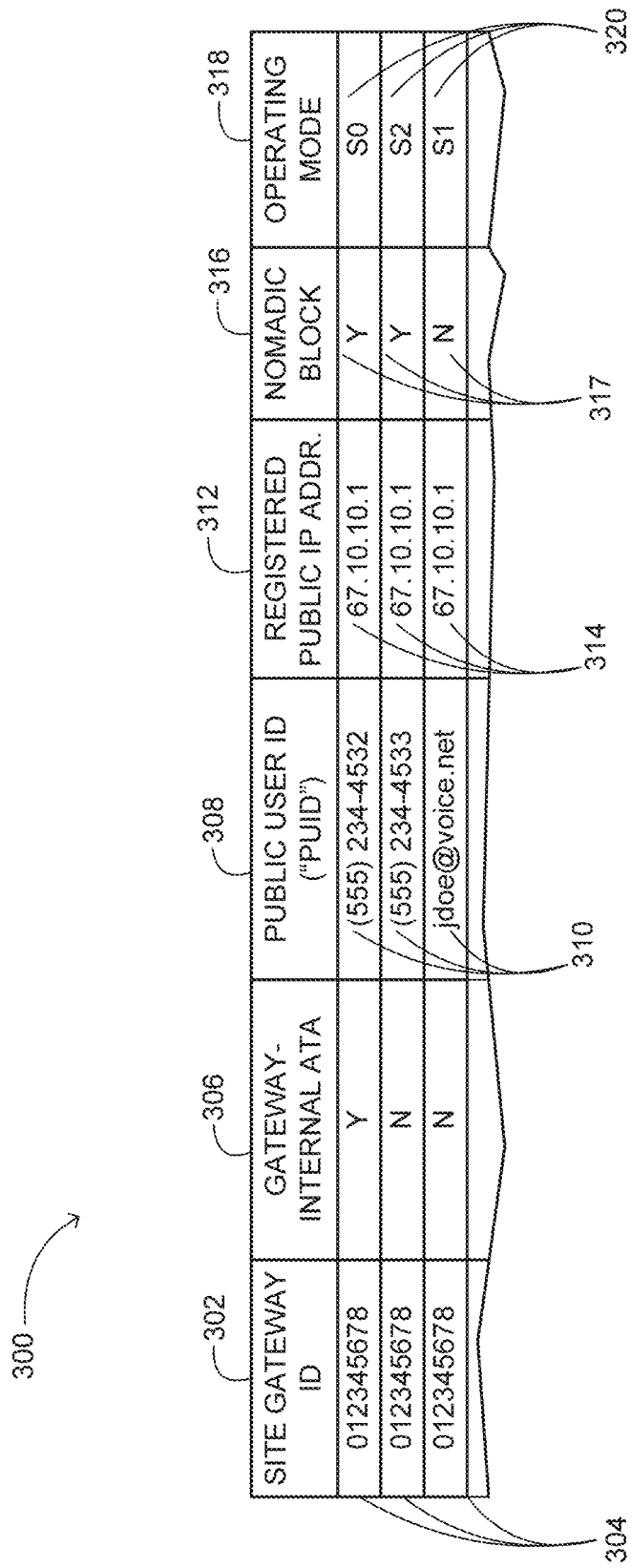
FIG. 3 is an example data structure showing account information associated with a VoIP service subscription.

FIG. 3 is an example data structure 300 showing associations between corresponding account information associated with a VoIP service subscription. The account information (e.g., features, network identifications, etc.) is associated with each PUID of a subscriber. In the illustrated example, the account information shown in the data structure 300 can be stored in different network entities of the IMS 112 (FIG. 1). For example, information shown in a particular column of the data structure 300 can be stored in the home subscriber services ("HSS") database 116 of FIG. 1, while other information in another column can be stored in the feature server 130 of FIG. 1 or any other network entity. Accordingly, particular columns of information shown in the data structure 300 may be stored throughout the example network system 100 in one or more network locations using a plurality of data structures and can be associated with one another using index keys (e.g., PUID's). However, for purposes of discussion, the information is shown in the data structure 300.

As shown in FIG. 3, the data structure 300 includes a site gateway ID column 302 that is used to store site gateway identification numbers 304 that uniquely identify the site gateway 104*a* of FIGS. 1 and 2. To indicate whether an ATA (e.g., one of the ATA's 210) is implemented within a gateway (e.g., the gateway 104*a* of FIGS. 1 and 2), the data structure 300 includes a gateway-internal ATA column 306. In the illustrated example, the gateway-internal ATA column 306 can be used to indicate that the ATA's 210 of FIG. 2 are gateway-internal ATA's.

The data structure 300 is provided with a public user ID (PUID) column 308 that is used to store a plurality of PUID's (e.g., telephone numbers) 310 assigned to a subscriber account. The PUID's 310 may be used with gateway-internal ATA's (e.g. the ATA's 210 of FIG. 2) and/or with VoIP telephones (e.g., the VoIP device 106). To associate a public IP address (e.g., the public IP addresses A and B of FIG. 1) with respective PUID's, the data structure 300 is provided with a registered public IP address column 312 having a plurality of registered public IP addresses 314. In the illustrated example, the registered public IP addresses 314 are used to detect when a VoIP device associated with one of the PUID's 310 may have been moved to another geographic location.

To indicate whether telephone numbers have been assigned a nomadic-allowed or a nomadic-blocked feature, the data structure 300 is provided with a nomadic block column 316 that stores a plurality of nomadic service designators 317. Each of the nomadic service designators 317 corresponds to one of the PUID's 310 and indicates whether the corresponding PUID's 310 is nomadic-blocked (Y) or nomadic-enabled (N). A nomadic-enabled (N) designator indicates a PUID and its associated VoIP device (e.g., the VoIP device 106) are allowed to access VoIP services when the associated VoIP device is moved away from a primary or pre-designated geographic location.

To store operating modes associated with the PUID's 310 used in combination with VoIP devices, the data structure 300 is provided with an operating mode column 318 that stores operating mode designators 320 (e.g., the operating mode designators S0, S1, and S2). In the illustrated example, the operating mode designators 320 in the operating mode column are stored in the feature server 130 of FIG. 1. In the example of FIG. 3, the S0 operating mode is an unrestricted operating mode in which a VoIP device can access substantially all VoIP services associated with a service subscription corresponding to the VoIP device (or corresponding to the PUID(s) used with that VoIP device). In contrast, the S1 operating mode is a suspended operating mode that restricts the VoIP device to use of a subset of the VoIP services associated with a service subscription corresponding to the VoIP device (or PUID(s) used with the VoIP device). The S2 operating mode of the illustrated example allows the VoIP device to access the same or less VoIP services as those allowed in the S1 (suspended) operating mode. In some example implementations, additional operating modes may be implemented (e.g., an operating mode that disallows any incoming or outgoing calls).

Figure 4:
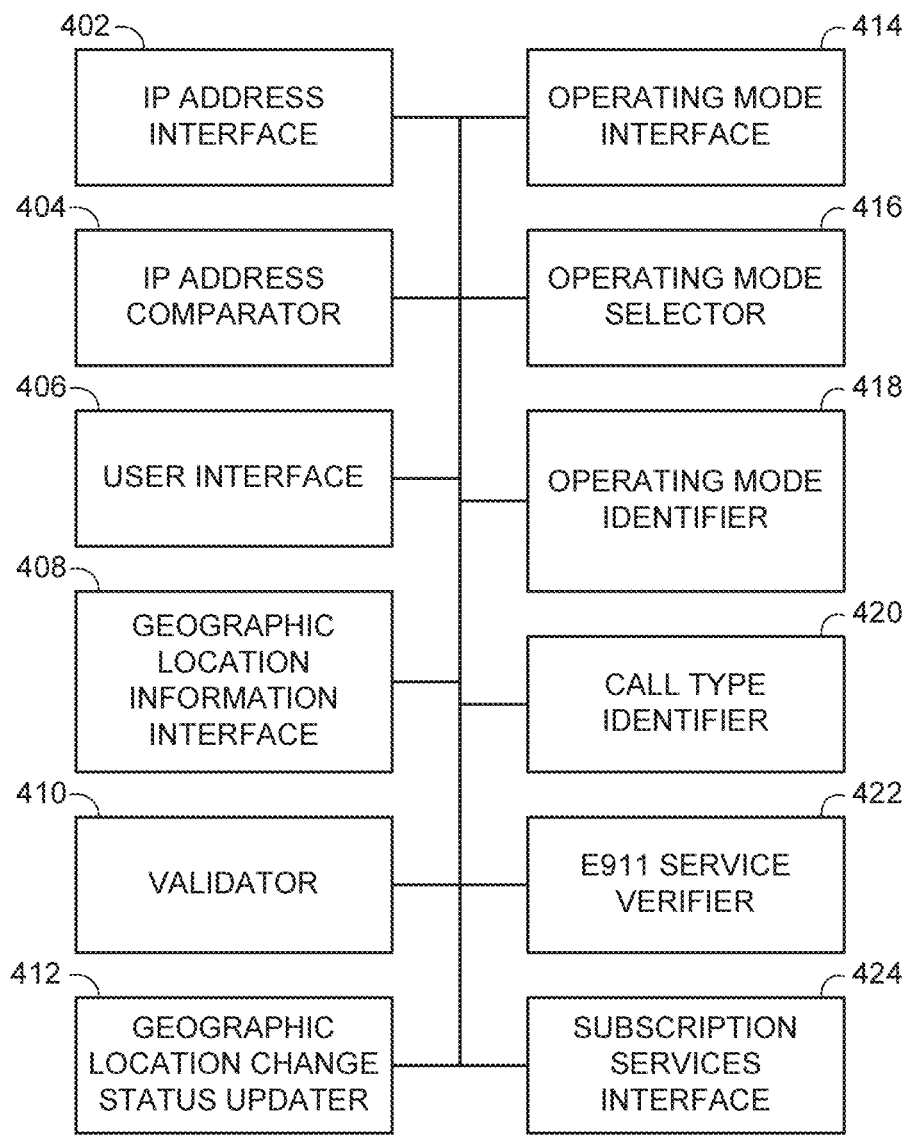
FIG. 4 is a block diagram of an example system to provide E911 service to VoIP devices.

FIG. 4 is a block diagram of an example system 400 configured to provide support functions for E911 services to VoIP devices associated with nomadic usage. The example system 400 includes an IP address interface 402, an IP address comparator 404, a user interface 406, a geographic location information interface 408, a validator 410, a geographic location change status updater 412, an operating mode interface 414, an operating mode selector 416, an operating mode identifier 418, a call type identifier 420, an E911 service verifier 422, and a subscription services interface 424, all of which may be implemented using any desired combination of hardware, firmware, and/or software. For example, one or more integrated circuits, discrete semiconductor components, or passive electronic components may be used. Additionally or alternatively, some or all of the blocks of the example system 400, or parts thereof, may be implemented using instructions, code, and/or other software and/or firmware, etc. stored on a machine accessible medium that, when executed by, for example, a processor system (e.g., the example processor system 810 of FIG. 8), perform the operations represented in the flow diagrams of FIGS. 5, 6A, 6B, and 7. In the illustrated example, the blocks of the example system 400 are distributed among various network entities in the example network system 100 of FIG. 1. However, in alternative example implementations, the blocks of the example system 400 may be implemented using network entities other than those indicated below. For example, although the below description may indicate that a network entity of the example network system 100 implements one of the blocks of the example system 400, in one or more alternative example implementations, that network entity may be configured to implement two or more blocks of the example system 400 or none of the blocks. In addition, an example apparatus may be used to implement all of the blocks of the example system 400 and may be communicatively coupled to the example network system 100.

Turning in detail to the example system 400, to retrieve and store IP addresses (e.g., the public IP address A and B of FIG. 1, the public IP addresses 314 of FIG. 3, etc.), the example system 400 is provided with an IP address interface 402. In the illustrated example, the IP address interface 402 is implemented using the feature server 130 of FIG. 1. The IP address interface 402 is configured to receive public IP addresses (e.g., registration public IP addresses) via notifications from the HSS database 116 when VoIP devices register with the IMS 112. The IP address interface 402 also stores the public IP addresses in the feature server 130. In this manner, the feature server 130 can compare the received public IP addresses with future registration public IP addresses.

To compare registration public IP addresses used by VoIP devices with registered public IP address stored in association with VoIP devices (or PUID's used in combination with the VoIP devices) within the feature server 130 of FIG. 1, the example system 400 is provided with an IP address comparator 404. The example system 400 compares registration public IP addresses (e.g., the public IP addresses A and B of FIG. 1) with registered public IP addresses (e.g., the registered public IP addresses 314 of FIG. 3) to determine whether VoIP devices may have been moved between geographic locations. In the illustrated example, the IP address comparator 404 may be implemented using the HSS database 116 and an IP address comparator substantially similar or identical to the IP address comparator 404 may be implemented using the feature server 130. In this manner, when the VoIP device 106 (FIGS. 1 and 2) registers with the IMS 112, the IP address comparator 404 in the HSS database 116 can compare the public IP address A (a registration public IP address) of the site gateway 104a with a registered public IP address that was previously registered in association with the VoIP device 106. The HSS database 116 can then determine a geographic location change status based on the comparison and allow the VoIP device 106 to register based on the geographic location change status. In addition, an IP address comparator in the feature server 130 can compare registration and registered public IP addresses to determine if the feature server 130 should change VoIP device operating modes from the S0 mode to the S1 mode.

To present messages to a user via the VoIP device 106, the example system 400 is provided with a user interface 406. In the illustrated example, the user interface 406 is implemented using the IVR system 124 of FIG. 1 and is configured to playback audio messages to a user via the VoIP device 106. For example, the user interface 406 may have an audio file player or a text-to-speech converter (e.g., a speech synthesizer). Example audio messages include registered street addresses associated with the VoIP device 106 and requests for user to confirm whether a registered street address is the same as a current street address of the VoIP device 106. Other example audio messages include informing a user via the VoIP device 106 of operating modes of the VoIP device 106 and information on how to update registered street addresses. In other example implementations, the user interface 406 may also be configured to communicate and/or exchange text messages and/or other messages (e.g., video messages) with the VoIP device 106 so that some or all messages described above can be presented via a display of the VoIP device 106. In some example implementations, the functionality described in connection with the user interface 406 may be implemented using an external media server having a standard control interface, and the user interface 406 can be provided with a media server control interface to exchange information with the external media server.

To retrieve and/or store registered and/or user-provided geographic location information (e.g., registered street addresses), the example system 400 is provided with a geographic location interface 408. In the illustrated example, the geographic location interface 408 is implemented using the IVR 124 of FIG. 1 and is configured to access the LIS database 142 to retrieve registered geographic location information associated with corresponding PUID's of VoIP devices. As discussed above, a user may provide geographic location information via a web page served by the web server 122 or via a customer service representative in the customer service center 118. The web server 122 or the customer service center 118 then communicate the user-provided geographic location information to the LIS database 142. The LIS database 142 then updates registered geographic location information stored therein using the user-provided geographic location information if the validation database ("VDB") 144 of FIG. 1 determines that the user-provided geographic location information is valid (e.g., compliant with the master street address guide ("MSAG") standard).

To validate user-provided geographic location information, the example system 400 is provided with a validator 410. In the illustrated example, the validator 410 is implemented using the VDB 144 of FIG. 1 and is configured to determine whether user-provided geographic location information is MSAG-compliant. For example, if the validator 410 finds a street address stored in the VDB 144 to match the user-provided geographic location information, then the validator 410 indicates the user-provided geographic location information is valid.

To update geographic location change statuses associated with VoIP devices (e.g., the VoIP device 106 of FIGS. 1 and 2) and their respective PUID's (e.g., the PUID's 310 of FIG. 3), the example system 400 is provided with a geographic location change status updater 412. In the illustrated example, the geographic location change status updater 412 is implemented using the feature server 130 of FIG. 1 and is configured to update the location change status (e.g., geographic location has not changed, geographic location may have changed, etc.) associated with a VoIP device when the IP address comparator 404 determines that a registered public IP address associated with the VoIP device 106 and a current public IP address used by the VoIP device 106 (during, for example, registration) do not match.

To retrieve and store operating modes associated with VoIP devices, the example system 400 is provided with an operating mode interface 414. In the illustrated example, the operating mode interface 414 is implemented using the feature server 130 of FIG. 1 and is configured to store operating mode designators (e.g., the operating mode designators 320 of FIG. 3) in the feature server 130 and retrieve operating mode designators from the feature server 130.

To select operating modes for association with VoIP devices, the example system 400 of FIG. 4 is provided with an operating mode selector 416. In the illustrated example, the operating mode selector 416 is implemented using the feature server 130 of FIG. 1 and is configured to select operating modes (e.g., the operating modes S0, S1, or S2) based on location change statuses associated with VoIP devices, based on whether registered geographic location information is up to date, and/or based on whether VoIP devices are in locations for which VoIP service providers can provide E911 service. To detect which operating modes are associated with VoIP devices, the example system 400 of FIG. 4 is provided with an operating mode identifier 418. In the illustrated example, the operating mode identifier 418 is implemented using the feature server 130 of FIG. 1.

To identify the type of calls initiated by VoIP devices, the example system 400 is provided with a call type identifier 420. In the illustrated example, the call type identifier 420 is implemented using the feature server 130 and is configured to determine whether calls are being made to 911 or to a PUID authorized by a VoIP service provider. For example, when the VoIP device 106 is associated with the S1 (suspended) mode, a VoIP service provider allows the VoIP device 106 to make calls only to 911 or to pre-selected, authorized numbers (e.g., a customer service number). To enable the allowed calls, the call type identifier 420 extracts information from a call initiation signal communicated by the VoIP device 106 and identifies the call type.

To determine whether a VoIP service provider of the VoIP device 106 can provide E911 service at a location within which the VoIP device 106 is located, the example system 400 is provided with an E911 service verifier 422. In the illustrated example, the E911 service verifier 422 is implemented using the LIS database 142 of FIG. 1. Also in the illustrated example, if the E911 service verifier 422 determines that the VoIP service provider of the VoIP device 106 cannot offer E911 service, the feature server 130 is configured to forward any 911 calls made from the VoIP device 106 to a 911 operator that will handle or process the 911 call without the location-identifying features of E911 service.

To determine the service subscriptions associated with a particular VoIP device, the example system 400 is provided with a subscription services interface 424. In the illustrated example, the subscription services interface 424 is implemented using the HSS database 116 of FIG. 1 and is configured to retrieve service options (e.g., the nomadic service designators 317 of FIG. 3) from subscriber accounts stored in the HSS database 116 to determine the services to which users are subscribed.

FIGS. 5, 6A, 6B, and 7 are flowcharts representative of example machine readable instructions that may be executed to detect geographic location changes of VoIP devices, process VoIP calls initiated by VoIP devices, and update registered geographic location information associated with VoIP devices to implement the example system 400 of FIG. 4. Although the example machine readable instructions are described with reference to the flowcharts of FIGS. 5, 6A, 6B, and 7, persons of ordinary skill in the art will readily appreciate that other methods of detecting geographic location changes, processing VoIP calls, updating geographic location changes and, generally, implementing the example system 400 of FIG. 4 may additionally or alternatively be used. For example, the order of execution of the blocks depicted in the flowcharts of FIGS. 5, 6A, 6B, and 7 may be changed, and/or some of the blocks described may be rearranged, eliminated, or combined.

Figure 5:
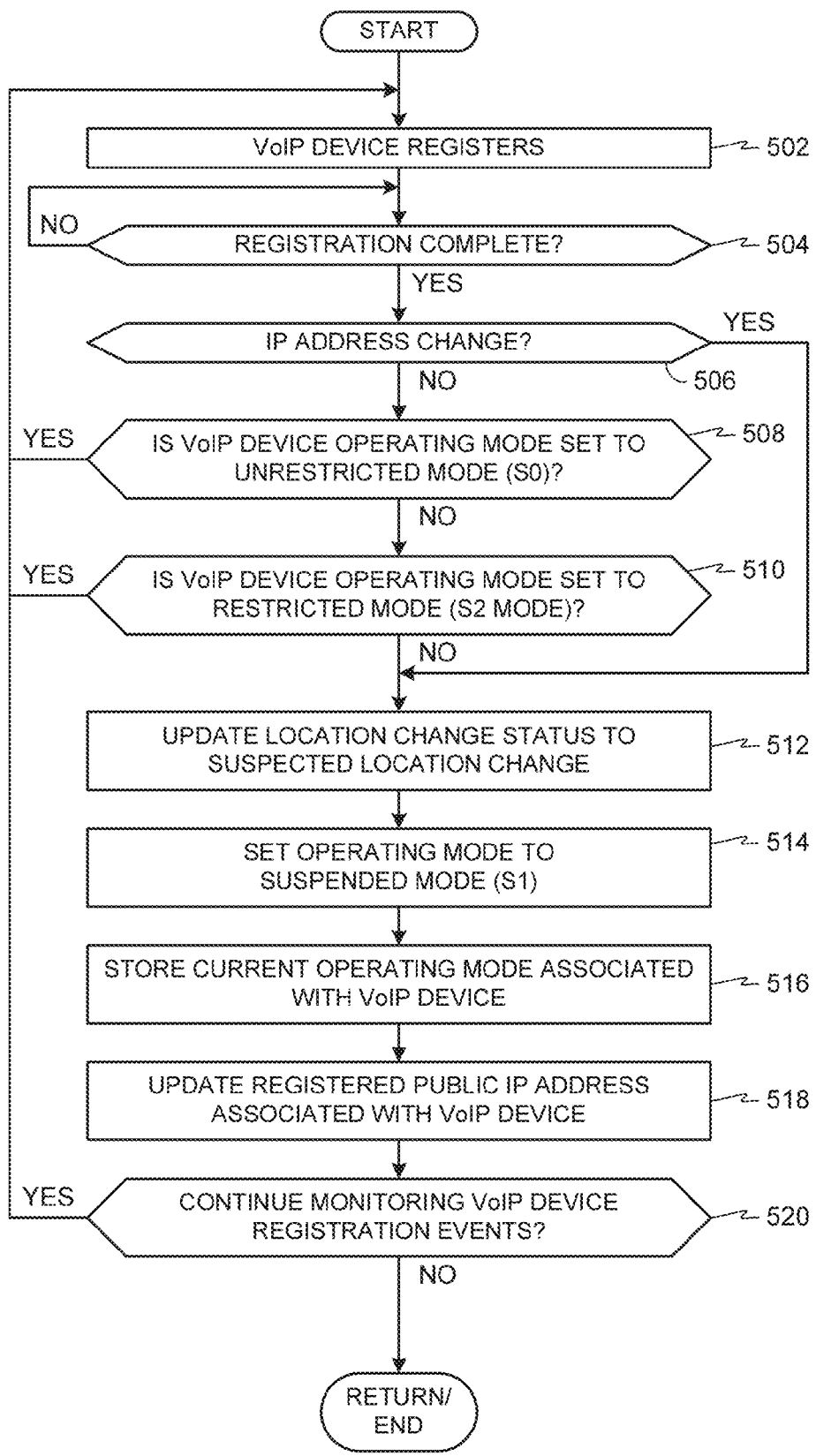
FIG. 5 is a flowchart representative of example machine readable instructions that may be executed to determine whether a VoIP device may have been moved to another geographic location.

FIG. 5 is a flowchart representative of example machine readable instructions that may be executed to determine whether the VoIP device 106 may have been moved to another geographic location. Initially, the VoIP device 106 of FIGS. 1 and 2 registers with the IMS 112 (block 502). During the VoIP device registration process (block 502), the HSS database 116 can prevent the VoIP device 106 from registering if the subscription services interface 424 (FIG. 4) determines that the VoIP device 106 is not nomadic-enabled. However, if the HSS database 116 does allow the VoIP device 106 to register, but registration is not complete (block 504), the process of FIG. 5 waits at block 504 until registration is complete. Otherwise, if registration is complete (block 504), the IP address comparator 404 (FIG. 4) determines whether the public IP address (e.g., the public IP address A of FIG. 1) associated with the VoIP device 106 has changed (i.e., if the registration public IP address used to register the VoIP device is different from the previously registered public IP address stored in the feature server 130 of FIG. 1) (block 506).

During the registration process of block 502, the IP address interface 402 stores the registration public IP address of the VoIP device 106 in the feature server 130. At block 506, to determine whether the registration public IP address associated with the VoIP device 106 is different from the registered public IP address associated with the VoIP device 106, the IP address comparator 404 retrieves the registered public IP address and the registration public IP address from the feature server 130 and compares the IP addresses to determine whether they are identical (block 506). In the illustrated example, the public IP addresses can be identical if the VoIP device 106 registers or attempts to register from the same network location (e.g., the subscriber site 102a of FIG. 1) two or more consecutive times because the public IP address of the network location gateway (e.g., the public IP address A of the site gateway 104a of FIG. 1) is stored in the feature server 130 during each registration process. In some cases, during a first registration process, the VoIP operating mode may be set to the S1 (suspended) mode if the user of the VoIP device 106 does not confirm or update the registered geographic location information. Thus, during subsequent registration attempts, although the registered public IP address and the public IP address used to register the VoIP device 106 may be the same, the example system 400 will limit operation of the VoIP device 106 to the S1 (suspended) mode until the user confirms or updates the registered geographic location information.

If the public IP addresses are the same (i.e., no IP address change has occurred) (block 506), the operating mode identifier 418 (FIG. 4) determines whether the operating mode associated with the VoIP device 106 is set to the S0 (unrestricted) mode (block 508). In the illustrated example, the operating mode interface 414 retrieves the current operating mode designator (e.g., one of the operating mode designators 320 of FIG. 3) associated with the VoIP device 106 from the feature server 130 of FIG. 1 and the operating mode identifier 418 determines whether the operating mode designator indicates the S0 (unrestricted) operating mode (block 508). If the operating mode identifier 418 determines that the VoIP device operating mode is not set to the S0 (unrestricted) operating mode, the operating mode identifier 418 determines if the VoIP device operating mode is set to the S2 (restricted) operating mode (block 510).

If the operating mode identifier 418 determines that the operating mode is not set to the S2 (restricted) mode (block 510) or if the IP address comparator 404 determines that the public IP address associated with the VoIP device 106 has changed (block 506), the geographic location change status updater 412 (FIG. 4) updates the location change status associated with the VoIP device 106 to "suspected location change" (block 512) to indicate that the VoIP device 106 may have been moved to a different geographic location. Also, the operating mode selector 416 (FIG. 4) sets the operating mode associated with the VoIP device 106 to the S1 (suspended) mode (block 514). For cases in which the operating mode selector 416 has previously set the operating mode associated with the VoIP device 106 to the S1 (suspended) mode, the operating mode selector 416 may be configured to confirm at block 514 that the operating mode associated with the VoIP device 106 is set to the S1 (suspended) mode.

The operating mode interface 414 then stores the current operating mode associated with the VoIP device (block 516) in, for example, the feature server 130 of FIG. 1 (e.g., in the operating mode column 318 of FIG. 3). Also, the IP address interface 402 updates the registered public IP address associated with the VoIP device 106 (block 518) in, for example, the feature server 130 of FIG. 1 (e.g., in the public IP address column 312 of FIG. 3) by replacing the previously registered public IP address with the registration public IP address received at block 502.

The example system 400 then determines whether it should continue monitoring VoIP device registration events (block 520). For example, the example system 400 may determine not to continue monitoring if the monitoring operation of the example system 400 is disabled by a VoIP service provider or if the monitoring operation of the example system 400 is interrupt driven and monitors only upon detection of particular events (e.g., a VoIP device plugged into the network). In an example implementation, the example system 400 is preferably, but not necessarily, configured to continuously monitor VoIP device registration events, and block 520 always returns control to block 502.

If the example system 400 determines that it should continue monitoring for an IP address change (block 520) or if the operating mode identifier 418 determines that the VoIP device 106 is associated with the S2 (restricted) mode (block 510) or the S0 (unrestricted) mode (block 508), control returns to block 502 for a subsequent registration of the VoIP device 106 or any other VoIP device. Otherwise, if the example system 400 determines that it should not continue monitoring for an IP address change (block 502), then the process of FIG. 5 is ended and/or control is returned to a calling function or process.

Although the example process of FIG. 5 uses the registered public IP address and the current public IP address (the registration public IP address) associated with the VoIP device 106 to determine whether the VoIP device 106 may have changed geographic locations, in alternative example implementations, other example methods may be used to detect geographic location changes of the VoIP device 106.

Figure 6A:
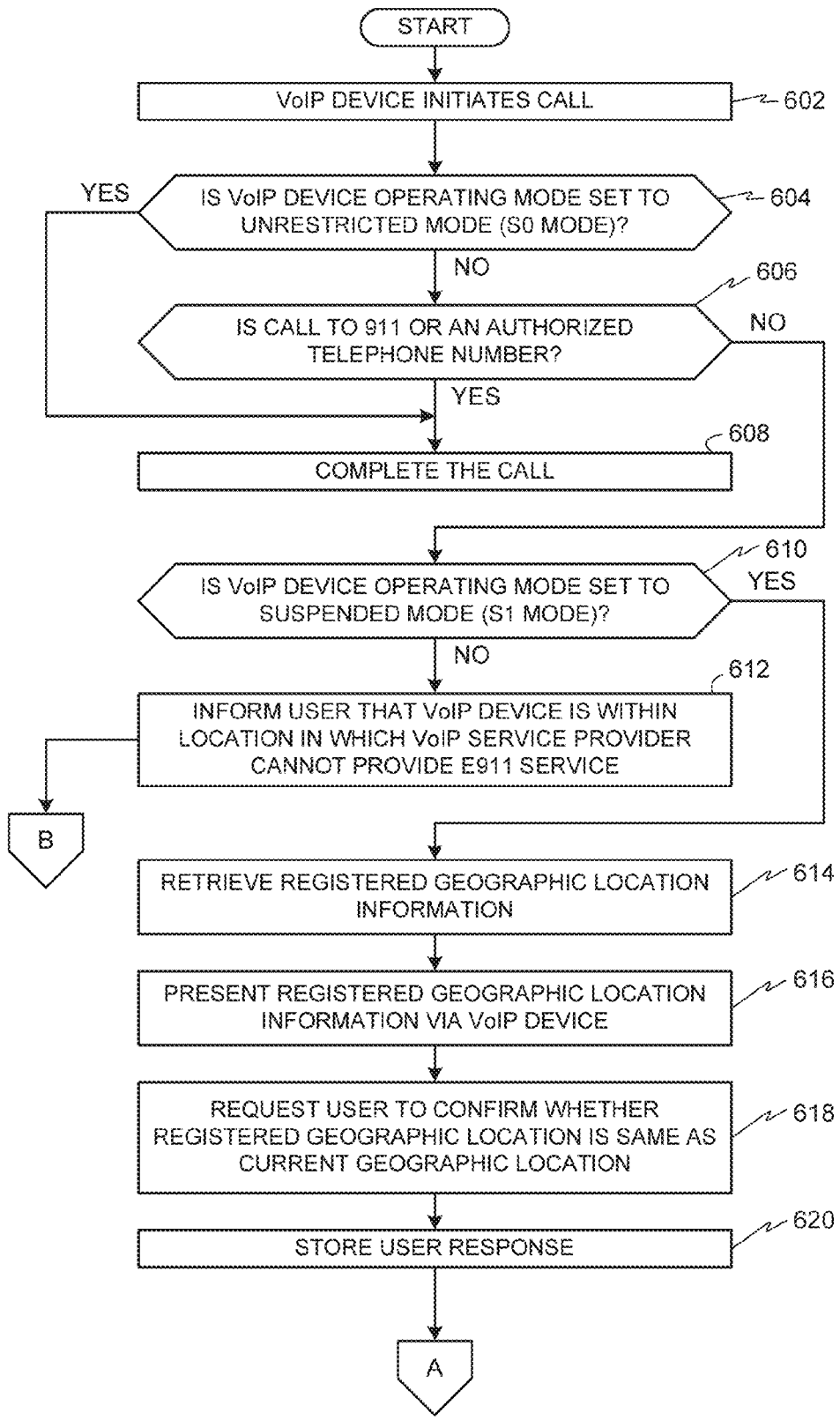
FIGS. 6A and 6B depict a flowchart representative of example machine readable instructions that may be executed to process a VoIP call initiated by a VoIP device.
Figure 6B:
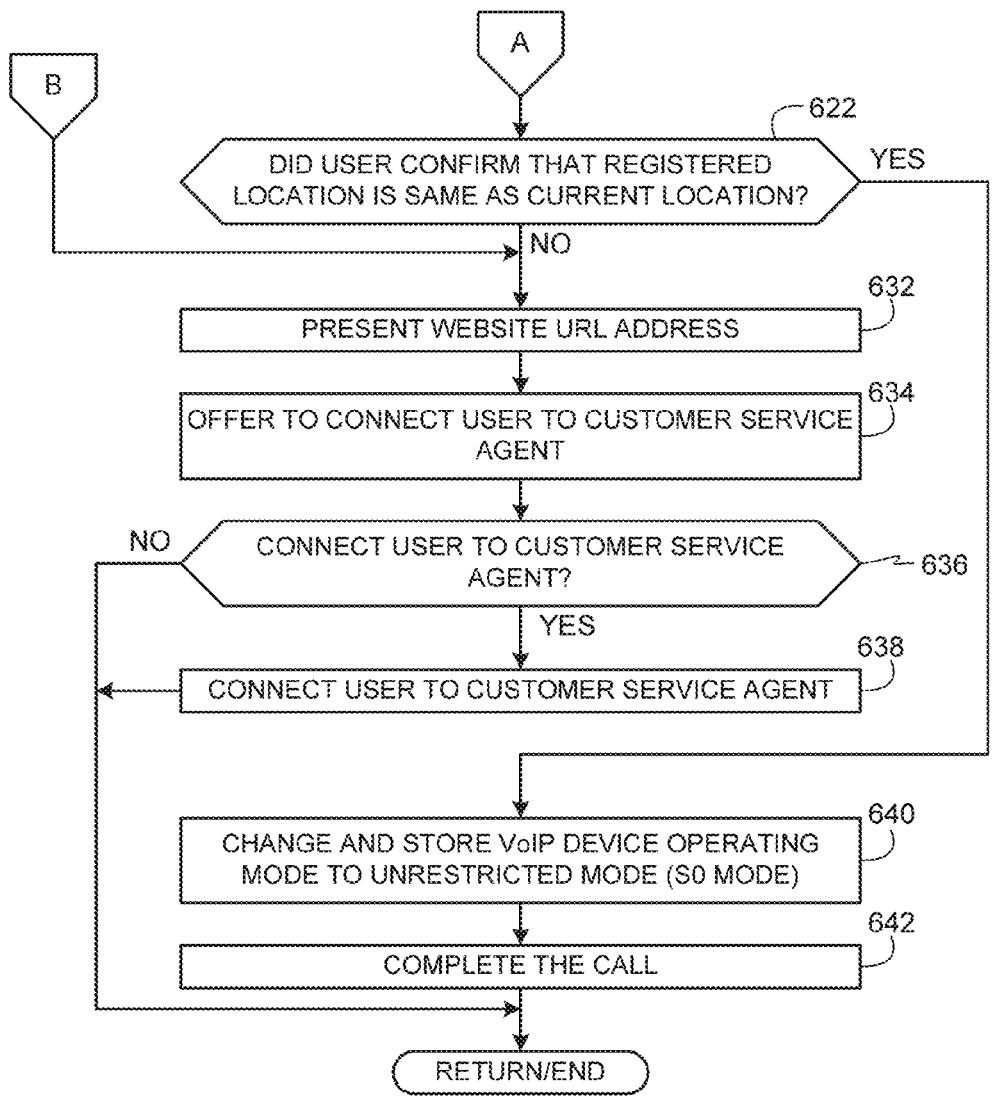

FIGS. 6A and 6B are a flowchart representative of example machine readable instructions that may be executed to process a VoIP call initiated by an example VoIP device 106. Initially, the VoIP device 106 initiates a call (block 602). In the illustrated example, the VoIP device 106 communicates a call initiation request to the CSC 128 of FIG. 1 and the CSC 128 uses the feature server 130 to initiate and process the call. The operating mode identifier 418 (FIG. 4) then determines whether the operating mode associated with the VoIP device 106 is set to an S0 (unrestricted) operating mode (block 604). In the illustrated example, to determine whether the VoIP device operating mode is set to the S0 (unrestricted) mode, the operating mode interface 414 retrieves the operating mode designator (e.g., one of the operating mode designators 320 of FIG. 3) associated with the VoIP device 106 from the feature server 130 and the operating mode identifier 418 determines whether the retrieved operating mode designator indicates the S0 (unrestricted) mode (block 604). If the operating mode identifier 418 determines that the VoIP device operating mode is not set to the S0 (unrestricted) operating mode (block 604) (i.e., the operating mode is instead set to the S1 (suspended) mode or S2 (restricted) mode), then the call type identifier 420 (FIG. 4) determines whether the call being initiated is a call to 911 or a call to an authorized telephone number (block 606) (e.g., a customer service telephone number authorized by the VoIP service provider). If the call type identifier 420 determines that the call is to 911 or to another authorized PUID (block 606), or if the operating mode identifier 418 determines that the VoIP device operating mode is set to the S0 (unrestricted) mode, the CSC 128 completes initiation of the call (block 608).

If the call type identifier 420 determines that the call is not to 911 or to another authorized telephone number (block 606), the operating mode identifier 418 determines whether the VoIP device operating mode is set to an S1 (suspended) operating mode (block 610). If the operating mode identifier 418 determines that the VoIP device operating mode is not set to an S1 (suspended) operating mode (block 610) (i.e., the operating mode is instead set to the S2 (restricted) mode), the user interface 406 presents a message via the VoIP device 106 to inform a user of the VoIP device 106 that the VoIP device 106 is within a location in which the VoIP service provider of the VoIP device 106 cannot provide E911 service (block 612). In the illustrated example, the message is an audio message presented by, for example, the IVR system 124 of FIG. 1, but any other desired messaging medium may be employed.

If the operating mode identifier 418 determines that the VoIP device operating mode is set to an S1 (suspended) operating mode (block 610), the geographic location information interface 408 (FIG. 4) retrieves registered geographic location information (e.g., a street address) associated with the VoIP device 106 (block 614). In the illustrated example, the geographic location information interface 408 accesses the LIS database 142 to retrieve the registered street address stored in association with the PUID of the VoIP device 106. The user interface 406 then presents the registered geographic location information via the VoIP device 106 (block 616) and requests the user of the VoIP device 106 to confirm whether the registered geographic location is the same as the current geographic location of the VoIP device 106 (block 618). In the illustrated example, the IVR system 124 of FIG. 1 implements the user interface 406 and performs a text-to-speech conversion of the registered street address to present an audio message via the VoIP device 106. In other example implementations, the LIS database 142 may store audio files (e.g., WAV files) of registered street addresses and the IVR system 124 may play back the audio files via the VoIP device 106. In addition, in other example implementations, the registered geographic location information may be presented (block 616) via text or video on a display screen of the VoIP device 106 and/or other user interface screens may be used to request the user to confirm the location of the VoIP device 106 (block 618). The NMS 114 then stores the user response regarding whether the registered geographic location is the same as the current geographic location of the VoIP device 106 (block 620). In the illustrated example, the user interface 406 communicates the user response to the NMS 114 along with the user's PUID and a date and time stamp of when the user responded, and the NMS 114 stores the user's PUID in association with the date and time stamp. In this manner, the VoIP service provider can keep records of whether and when users confirmed their geographic location.

After the NMS 114 stores the user response (block 620), the geographic location change status updater 412 (FIG. 4) determines whether the user confirmed that the registered geographic location of the VoIP device 106 is the same as the current geographic location of the VoIP device 106 (block 622) (FIG. 6B) based on, for example, the user response requested at block 618. For example, the geographic location change status updater 412 determines that the registered geographic location of the VoIP device 106 is the same as the current geographic location if the user response confirmed (e.g., "Yes") that the registered geographic location of the VoIP device 106 is the same as the current geographic location. If the geographic location change status updater 412 determines that the geographic locations are not the same or after the user interface 406 informs the user that the VoIP device is within a location in which the VoIP service provider cannot provide E911 service (block 612), the user interface 406 presents a website uniform resource locator ("URL") address via the VoIP device (block 632) that the user can visit to provide updated geographic location information and/or to obtain more information on the messages presented by the user interface 406. Additionally or alternatively, the user interface 406 offers to connect the user to a customer service agent (block 634) at the customer service center 118 of FIG. 1. If the user elects to be connected to a customer service agent (block 636), then the user interface 406 connects the call to a customer service agent (block 638).

If at block 622, the geographic location change status updater 412 determines that the user confirmed that the geographic locations are the same, the operating mode selector 416 changes the VoIP device operating mode to the S0 (unrestricted) mode and the operating mode interface 414 stores the operating mode (block 640) in, for example, the feature server 130 of FIG. 1. The CSC 128 of FIG. 1 then completes the call (block 642). The example process of FIGS. 6A and 6B then returns control to a calling function or process and/or ends.

Figure 7:
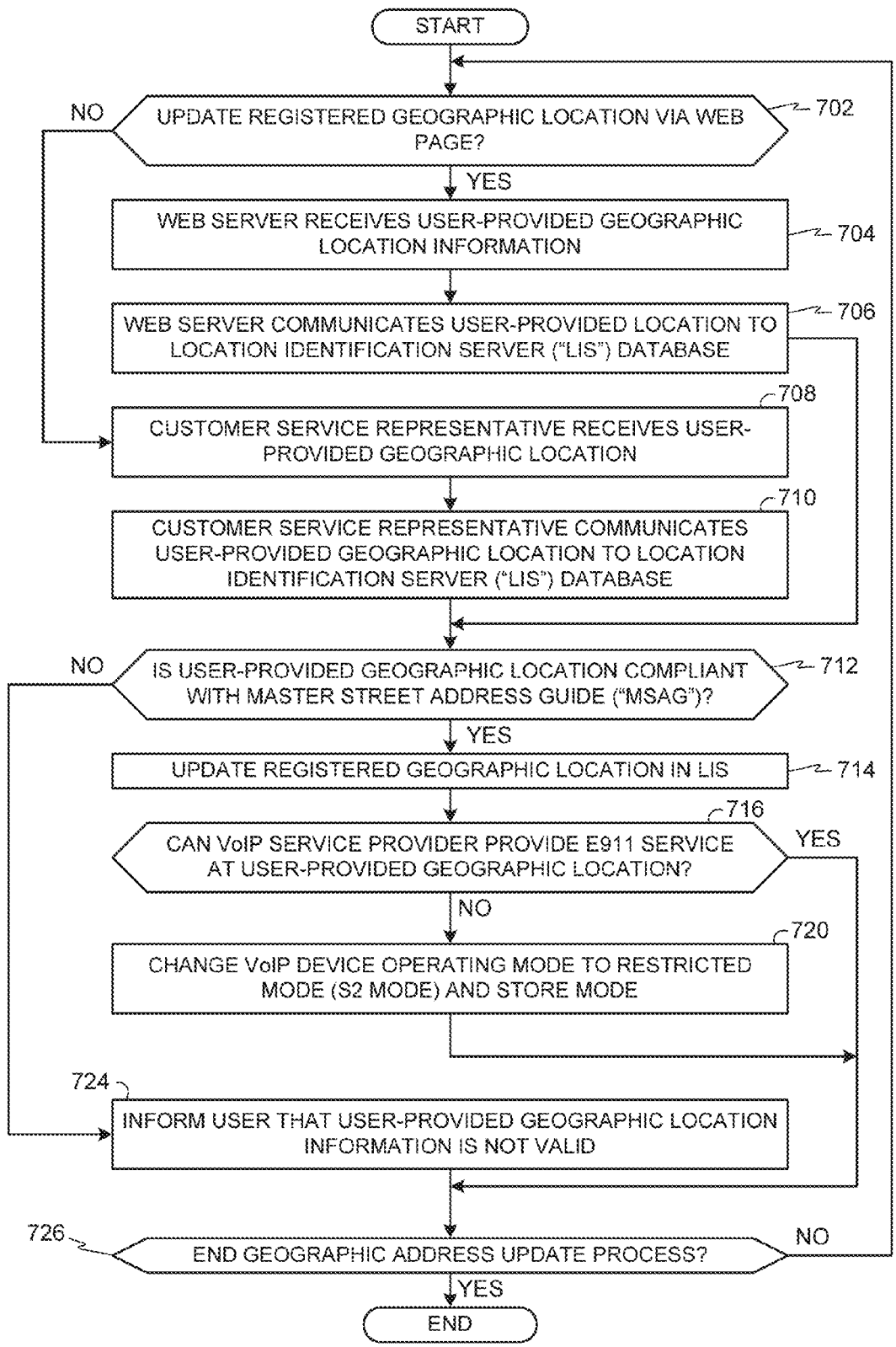
FIG. 7 is a flowchart representative of example machine readable instructions that may be executed to update a registered geographic location associated with a VoIP device.

FIG. 7 is a flowchart representative of example machine readable instructions that may be executed to update a registered geographic location associated with the VoIP device 106. Initially, if the user of the VoIP device 106 updates the registered geographic location via a web page (block 702), the web server 122 of FIG. 1 receives the user-provided geographic location information (block 704) such as, for example, a user-provided street address. The web server 122 then communicates the user-provided geographic location information to the LIS database 142 of FIG. 1.

If the user of the VoIP device 106 does not update the registered geographic location via a web page (block 702), and a customer service representative at the customer service center 118 receives the user-provided geographic location information (block 708) from the user of the VoIP device 106, the customer service representative communicates the user-provided geographic location information to the LIS database 142 (block 710).

After the LIS database 142 receives the user-provided geographic location information (block 706 or block 710), the validator 410 (FIG. 4) determines whether the user-provided geographic location information is MSAG-compliant (i.e., valid) (block 712). In the illustrated example, the user-provided geographic location information is a street address that the validator 410 compares with addresses stored in the validation database ("VDB") 144 of FIG. 1 to determine if the user-provided street address is MSAG-compliant. If the user-provided geographic location information is MSAG-compliant (block 712), the geographic location information interface 408 updates the registered geographic location information in the LIS database 142 with the user-provided geographic location information (block 714).

The E911 service verifier 422 (FIG. 4) then determines whether the VoIP service provider of the VoIP device 106 can provide E911 service at the user-provided geographic location (block 716). If the VoIP service provider cannot provide E911 service at the user-provided geographic location (block 716), the NMS 114 instructs the operating mode selector 416 (FIG. 4) to change the operating mode associated with the VoIP device 106 to the S2 (restricted) mode and stores the restricted mode designator (block 720) in, for example, the feature server 130.

If the validator 410 determines that the user-provided geographic location information is not MSAG-compliant (block 712), the web server 122 or the customer service representative assisting the user of the VoIP device 106 informs the user that the user-provided geographic location information (e.g., the street address) is not valid (block 724). The user must then provide another geographic location. In some cases, the geographic location information may not be MSAG-compliant due to a typographical error, a missing zip code, or some other trivial mistake, and the user need merely re-type the geographic location information.

After informing the user that the user-provided geographic location information is invalid or after changing the operating mode associated with the VoIP device 106 to the S2 (restricted) mode and storing the restricted mode designator (block 720) or if the VoIP service provider can provide E911 service at the user-provided geographic location (block 716), the web server 122 or the customer service representative assisting the user of the VoIP device 106 then determines whether to end the geographic address update process (block 726). For example, the web server 122 may determine that it should end the process if the user of the VoIP device 106 has closed or logged out of the web page used to update the geographic location information, and/or the customer service representative may determine to end the process if the user has elected to end the call with the customer service representative. If the web server 122 or the customer service representative determines that the geographic location information update process should not end, then control is passed back to block 702. Otherwise, the process of FIG. 7 ends.

Figure 8:
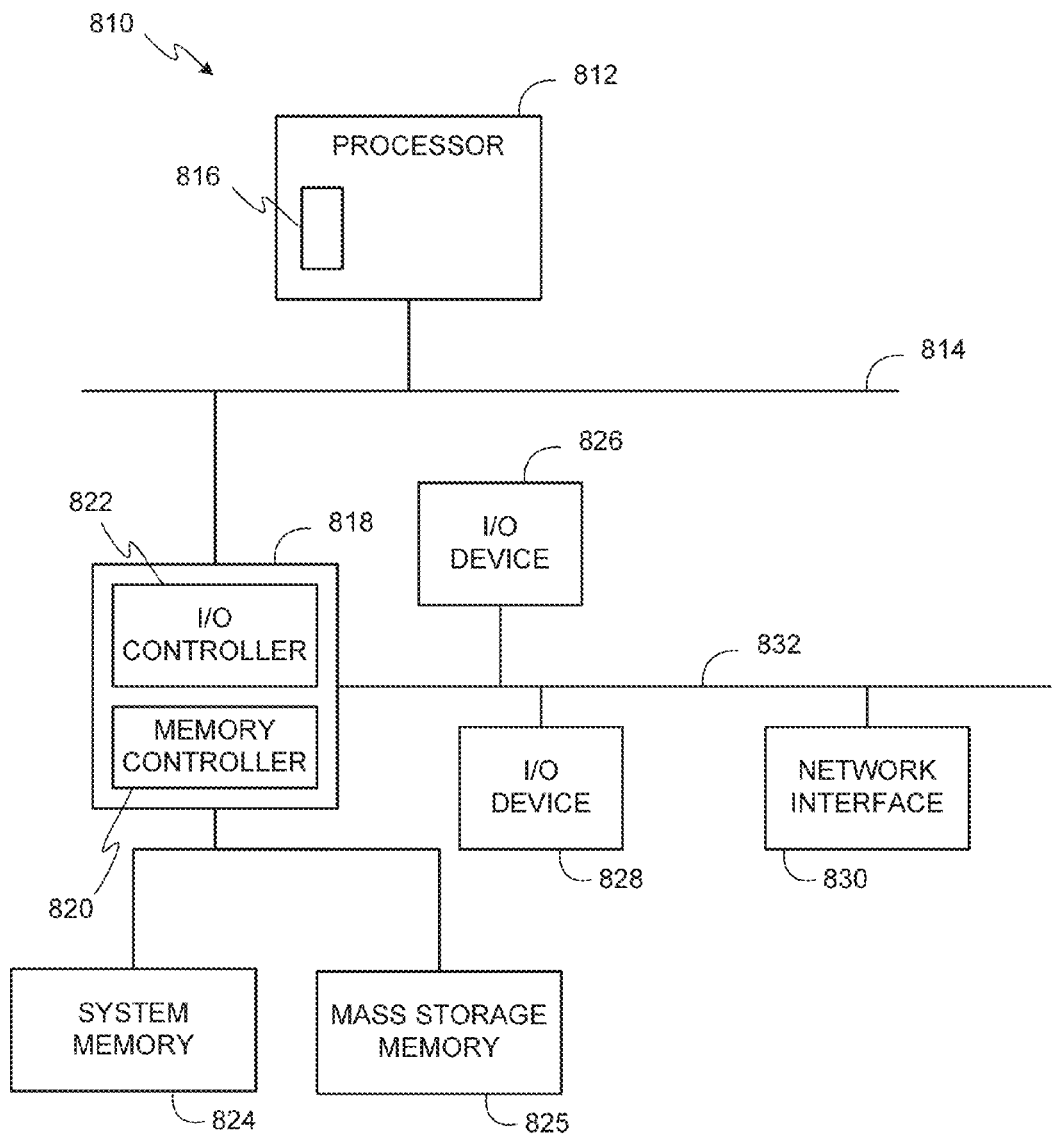
FIG. 8 is a block diagram of an example processor system that may be used to execute the example machine readable instructions of FIGS. 5, 6A, 6B, and/or 7 to implement the example system of FIG. 4.

FIG. 8 is a block diagram of an example processor system 810 that may be used to implement the example apparatus, methods, and articles of manufacture described herein. For example, processor systems substantially similar or identical to the example processor system 810 may be used to implement the site gateways 104*a-b*, the network management system 114, the HSS database 116, the web server 122, the IVR system 124, the emergency services gateway 132, the call session controller 128, the feature server 130, the LIS database 142, the validation database 144, and/or the VPC 148, all shown in FIG. 1. In addition, processor systems substantially similar or identical to the example processor system 810 may be used to implement the IP address interface 402, the IP address comparator 404, the user interface 406, the geographic location information interface 408, the validator 410, the geographic location change status updater 412, the operating mode interface 414, the operating mode selector 416, the operating mode identifier 418, the call type identifier 420, the E911 service verifier 422, and/or the subscription services interface 424 of the example system 400 of FIG. 4.

As shown in FIG. 8, the processor system 810 includes a processor 812 that is coupled to an interconnection bus 814. The processor 812 includes a register set or register space 816, which is depicted in FIG. 8 as being entirely on-chip, but which could alternatively be located entirely or partially off-chip and directly coupled to the processor 812 via dedicated electrical connections and/or via the interconnection bus 814. The processor 812 may be any suitable processor, processing unit or microprocessor. Although not shown in FIG. 8, the system 810 may be a multi-processor system and, thus, may include one or more additional processors that are identical or similar to the processor 812 and that are communicatively coupled to the interconnection bus 814.

The processor 812 of FIG. 8 is coupled to a chipset 818, which includes a memory controller 820 and an input/output (I/O) controller 822. A chipset provides I/O and memory management functions as well as a plurality of general purpose and/or special purpose registers, timers, etc. that are accessible or used by one or more processors coupled to the chipset 818. The memory controller 820 performs functions that enable the processor 812 (or processors if there are multiple processors) to access a system memory 824 and a mass storage memory 825.

The system memory 824 may include any desired type of volatile and/or non-volatile memory such as, for example, static random access memory (SRAM), dynamic random access memory (DRAM), flash memory, read-only memory (ROM), etc. The mass storage memory 825 may include any desired type of mass storage device including hard disk drives, optical drives, tape storage devices, etc.

The I/O controller 822 performs functions that enable the processor 812 to communicate with peripheral input/output (I/O) devices 826 and 828 and a network interface 830 via an I/O bus 832. The I/O devices 826 and 828 may be any desired type of I/O device such as, for example, a keyboard, a video display or monitor, a mouse, etc. The network interface 830 may be, for example, an Ethernet device, an asynchronous transfer mode (ATM) device, an 802.11 device, a digital subscriber line (DSL) modem, a cable modem, a cellular modem, etc. that enables the processor system 810 to communicate with another processor system.

While the memory controller 820 and the I/O controller 822 are depicted in FIG. 8 as separate functional blocks within the chipset 818, the functions performed by these blocks may be integrated within a single semiconductor circuit or may be implemented using two or more separate integrated circuits.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above-described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: (1) a magnetic medium (e.g., a disk or tape); (2) a magneto-optical or optical medium such as a disk; or (3) a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or equivalents and successor media.

To the extent the above specification describes example components and functions with reference to particular devices, standards and/or protocols, it is understood that the teachings of the invention are not limited to such devices, standards and/or protocols. Such devices are periodically superseded by different, faster, and/or more efficient systems having the same general purpose. Accordingly, replacement devices, standards and/or protocols having the same general functions are equivalents which are intended to be included within the scope of the accompanying claims.

Further, although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

What is claimed is:

1. A method to associate voice over internet protocol information with emergency services information for an internet protocol device, the method comprising:

storing a first nomadic service designator in association with a first public user identifier, the first nomadic service designator to indicate whether the internet protocol device is allowed to access voice over internet protocol services in association with the first public user identifier from different network locations, and the first public user identifier to facilitate establishing a first call with the internet protocol device;

storing a second nomadic service designator in association with a second public user identifier, the second nomadic service designator to indicate whether the internet protocol device is allowed to access the voice over internet protocol services in association with the second public user identifier from the different network locations, the second public user identifier to facilitate establishing a second call with the internet protocol device, wherein the first and second nomadic service designators are configurable to respectively different nomadic permissions for the first and second public user identifiers; and storing an operating mode designator in association with the first public user identifier, the operating mode designator to:
indicate when the internet protocol device is in a suspended operating mode that restricts the internet protocol device to using a subset of communication services associated with a service subscription of the internet protocol device, and to using a 911 service, and
indicate when the internet protocol device is in an unrestricted operating mode, the unrestricted operating mode based on a registered geographic location associated with the internet protocol device being a current geographic location of the internet protocol device, and based on a service provider being able to provide an enhanced 911 (E911) service including a location-identification service at the current geographic location of the internet protocol device.

2. A method as defined in claim 1, wherein the operating mode designator is further to indicate when the internet protocol device is in a restricted operating mode in which the internet protocol device is restricted to using fewer or none of the communication services in the subset of the communication services that the internet protocol device is allowed to use in the suspended operating mode.

3. A method as defined in claim 1, wherein storing the operating mode designator to indicate when the internet protocol device is in the unrestricted operating mode is performed in response to receiving a response from a user of the internet protocol device confirming that the registered geographic location associated with the internet protocol device is the current geographic location of the internet protocol device.

4. A method as defined in claim 1, further comprising storing a public internet protocol address in association with the first and second public user identifiers, the public internet protocol address associated with the internet protocol device, wherein the public internet protocol address is registered to a gateway providing Internet access to the internet protocol device.

5. A method as defined in claim 1, wherein the internet protocol device is a voice over internet protocol telephone.

6. A method as defined in claim 1, wherein the first nomadic service designator is stored in association with the first public user identifier in a first data structure, the operating mode designator is stored in association with the first public user identifier in a second data structure, and the first nomadic service designator and the operating mode designator being in association with one another across the first and second data structures based on the same first public user identifier.

7. An apparatus to associate voice over internet protocol information with emergency services information for an internet protocol device, the apparatus comprising:
a memory to store:
a public internet protocol address in association with a first public user identifier, the public internet protocol address associated with the internet protocol device, and the first public user identifier used to establish a first call with the internet protocol device;
a first nomadic service designator in association with the first public user identifier, the first nomadic service designator to indicate whether the internet protocol device is allowed to access voice over internet protocol services in association with the first public user identifier from different network locations;
a second nomadic service designator in association with a second public user identifier, the second nomadic service designator to indicate whether the internet protocol device is allowed to access the voice over internet protocol services in association with the second public user identifier from the different network locations, the second public user identifier to facilitate establishing a second call with the internet protocol device, wherein the first and second nomadic service designators are configurable to respectively different nomadic permissions for the first and second public user identifiers; and
an operating mode designator in association with the first public user identifier, the operating mode designator to:
indicate when the internet protocol device is in a suspended operating mode that restricts the internet protocol device to using a subset of communication services associated with a service subscription of the internet protocol device, and to using a 911 service, and
indicate when the internet protocol device is in an unrestricted operating mode, the unrestricted operating mode based on a registered geographic location associated with the internet protocol device being a current geographic location of the internet protocol device, and based on a service provider being able to provide an enhanced 911 (E911) service including a location-identification service at the current geographic location of the internet protocol device; and
a processor to access the public internet protocol address, the first and second nomadic service designators, and the operating mode designator to provide the internet protocol device with the 911 service or the E911 service.

8. An apparatus as defined in claim 7, wherein the operating mode designator is further to indicate when the internet protocol device is in a restricted operating mode in which the internet protocol device is restricted to using fewer or none of the communication services in the subset of the communication services that the internet protocol device is allowed to use in the suspended operating mode.

9. An apparatus as defined in claim 7, wherein the operating mode designator is set to indicate when the internet protocol device is in the unrestricted operating mode in response to receiving a response from a user of the internet protocol device confirming that the registered geographic location associated with the internet protocol device is the current geographic location of the internet protocol device.

10. An apparatus as defined in claim 7, wherein the public internet protocol address is registered to a gateway providing Internet access to the internet protocol device.

11. An apparatus as defined in claim 7, wherein the first public user identifier is a telephone number or an email address.

12. An apparatus as defined in claim 7, wherein the first nomadic service designator is stored in association with the first public user identifier in a first data structure, the operating mode designator is stored in association with the first public user identifier in a second data structure, and the first nomadic service designator and the operating mode designator being in association with one another across the first and second data structures based on the same first public user identifier.

13. A tangible machine readable storage device comprising instructions which, when executed, cause a machine to perform a method comprising:
   storing a first nomadic service designator in association with a first public user identifier, the first nomadic service designator to indicate whether an internet protocol device is allowed to access voice over internet protocol services in association with the first public user identifier from different network locations, and the first public user identifier to facilitate establishing a first call with the internet protocol device;
   storing a second nomadic service designator in association with a second public user identifier, the second nomadic service designator to indicate whether the internet protocol device is allowed to access the voice over internet protocol services in association with the second public user identifier from the different network locations, the second public user identifier to facilitate establishing a second call with the internet protocol device, wherein the first and second nomadic service designators are configurable to respectively different nomadic permissions for the first and second public user identifiers; and
   storing an operating mode designator in association with the first public user identifier, the operating mode designator to:
      indicate when the internet protocol device is in a suspended operating mode that restricts the internet protocol device to using a subset of communication services associated with a service subscription of the internet protocol device, and to using a 911 service, and
      indicate when the internet protocol device is in an unrestricted operating mode, the unrestricted operating mode based on a registered geographic location associated with the internet protocol device being a current geographic location of the internet protocol device, and based on a service provider being able to provide an enhanced 911 (E911) service including a location-identification service at the current geographic location of the internet protocol device.

14. A tangible machine readable storage device as defined in claim 13, wherein the operating mode designator is further to indicate when the internet protocol device is in a restricted operating mode in which the internet protocol device is restricted to using fewer or none of the communication services in the subset of the communication services that the internet protocol device is allowed to use in the suspended operating mode.

15. A tangible machine readable storage device as defined in claim 13, wherein storing the operating mode designator to indicate when the internet protocol device is in the unrestricted operating mode is performed in response to receiving a response from a user of the internet protocol device confirming that the registered geographic location associated with the internet protocol device is the current geographic location of the internet protocol device.

16. A tangible machine readable storage device as defined in claim 13, wherein the first public user identifier is a telephone number or an email address.

17. A tangible machine readable storage device as defined in claim 13, wherein the first nomadic service designator is stored in association with the first public user identifier in a first data structure, the operating mode designator stored in association with the first public user identifier in a second data structure, and the first nomadic service designator and the operating mode designator being in association with one another across the first and second data structures based on the same first public user identifier.

* * * * *